(12) United States Patent
Krishnamoorthy et al.

(10) Patent No.: US 12,166,766 B1
(45) Date of Patent: Dec. 10, 2024

(54) MERGING ACCOUNTS ASSOCIATED WITH COMPUTING DEVICES

(71) Applicant: Amazon Technologies, Inc., Seattle, WA (US)

(72) Inventors: Venkatesh Krishnamoorthy, Bothell, WA (US); Pavan Kumar Kothagorla, Seattle, WA (US); Antony Issakov, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 262 days.

(21) Appl. No.: 17/871,544

(22) Filed: Jul. 22, 2022

Related U.S. Application Data

(63) Continuation of application No. 16/577,831, filed on Sep. 20, 2019, now Pat. No. 11,399,028.

(51) Int. Cl.
*H04L 9/40* (2022.01)

(52) U.S. Cl.
CPC ........ *H04L 63/102* (2013.01); *H04L 63/0861* (2013.01)

(58) Field of Classification Search
CPC .......................... H04L 63/102; H04L 63/0861
See application file for complete search history.

(56) References Cited

U.S. PATENT DOCUMENTS

| | | | |
|---|---|---|---|
| 5,761,669 A * | 6/1998 | Montague | H04L 63/20 707/999.103 |
| 7,475,419 B1 * | 1/2009 | Basu | H04L 63/105 713/168 |
| 9,009,805 B1 | 4/2015 | Kirkby et al. | |
| 9,043,870 B1 * | 5/2015 | Barenholz | G06F 21/31 726/28 |
| 9,491,155 B1 * | 11/2016 | Johansson | G06F 21/604 |
| 9,812,128 B2 | 11/2017 | Mixter et al. | |
| 9,912,664 B1 * | 3/2018 | Lam | H04L 63/10 |
| 10,332,513 B1 | 6/2019 | D'Souza et al. | |

(Continued)

FOREIGN PATENT DOCUMENTS

| | | | | |
|---|---|---|---|---|
| WO | WO2019024006 | | 2/2019 | |
| WO | WO-2021069067 A1 | * | 4/2021 | ........... H04L 67/306 |
| WO | WO-2023205855 A1 | * | 11/2023 | |

OTHER PUBLICATIONS

Office Action for U.S. Appl. No. 16/577,831, mailed on Oct. 12, 2021, Krishnamoorthy, "Merging Accounts Associated with Computing Devices", 6 pages.

*Primary Examiner* — Sarah Su
(74) *Attorney, Agent, or Firm* — Lee & Hayes, P.C.

(57) ABSTRACT

Systems and methods for accountless device control are disclosed. For example, a smart device may be acquired and plugged in for use. The smart device may gain network connectivity and a system associated with the smart device may request enablement of an application for use with the smart device from another system, such as a system associated with a voice-enabled device. The other system may generate and send user identifier data, and the system associated with the smart device may generate a shadow account in association with the user identifier data. The application may be enabled in association with the shadow account, and access credentials may be exchanged to securely send and receive information associated with operation of the access device.

20 Claims, 13 Drawing Sheets

(56) References Cited

U.S. PATENT DOCUMENTS

| | | | |
|---|---|---|---|
| 10,536,287 B1 | 1/2020 | Eblang et al. | |
| 10,623,246 B1* | 4/2020 | Iyer | H04L 12/2832 |
| 10,705,805 B1* | 7/2020 | Bosworth | G06F 40/186 |
| 10,841,756 B1 | 11/2020 | Sathyanarayana Rao et al. | |
| 10,877,637 B1 | 12/2020 | Antos et al. | |
| 10,950,228 B1 | 3/2021 | Tan et al. | |
| 10,986,088 B2* | 4/2021 | Hanifen | H04L 63/126 |
| 11,102,195 B1* | 8/2021 | Shanbhogue | H04L 12/2838 |
| 11,120,799 B1 | 9/2021 | Sundararaman et al. | |
| 11,528,274 B1* | 12/2022 | Krishnamoorthy | H04W 12/35 |
| 2008/0168539 A1 | 7/2008 | Stein | |
| 2016/0044385 A1* | 2/2016 | Kareeson | G06Q 20/1235 |
| | | | 725/27 |
| 2017/0134434 A1* | 5/2017 | Allen | H04L 63/105 |
| 2018/0089676 A1 | 3/2018 | Narasimhan et al. | |
| 2018/0096690 A1 | 4/2018 | Mixter et al. | |
| 2018/0144590 A1 | 5/2018 | Mixter et al. | |
| 2018/0249322 A1* | 8/2018 | Kim | H04W 8/183 |
| 2019/0036923 A1* | 1/2019 | Xuan | H04L 67/63 |
| 2019/0066670 A1 | 2/2019 | White et al. | |
| 2019/0081949 A1* | 3/2019 | Wu | G06F 21/554 |
| 2019/0259374 A1 | 8/2019 | Kwon et al. | |
| 2019/0349384 A1* | 11/2019 | Ruffner | H04L 63/102 |
| 2020/0380983 A1* | 12/2020 | Sundaram | G16Y 40/35 |
| 2021/0051145 A1 | 2/2021 | Chavakula | |
| 2022/0131863 A1* | 4/2022 | Riviello | H04L 63/10 |
| 2024/0211957 A1* | 6/2024 | Robinson | G06Q 10/10 |

* cited by examiner

MERGING ACCOUNTS ASSOCIATED WITH COMPUTING DEVICES

RELATED APPLICATIONS

This application claims priority to and is a continuation of U.S. patent application Ser. No. 16/577,831, filed on Sep. 20, 2019, which will issue as U.S. Pat. No. 11,399,028 on Jul. 26, 2022, the entire contents of which are incorporated herein by reference.

BACKGROUND

Smart-home devices may be useful for a range of actions. Hands-free control of such smart-home devices may be advantageous. Described herein are improvements in technology and solutions to technical problems that can be used to, among other things, assist in control of smart-home devices.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
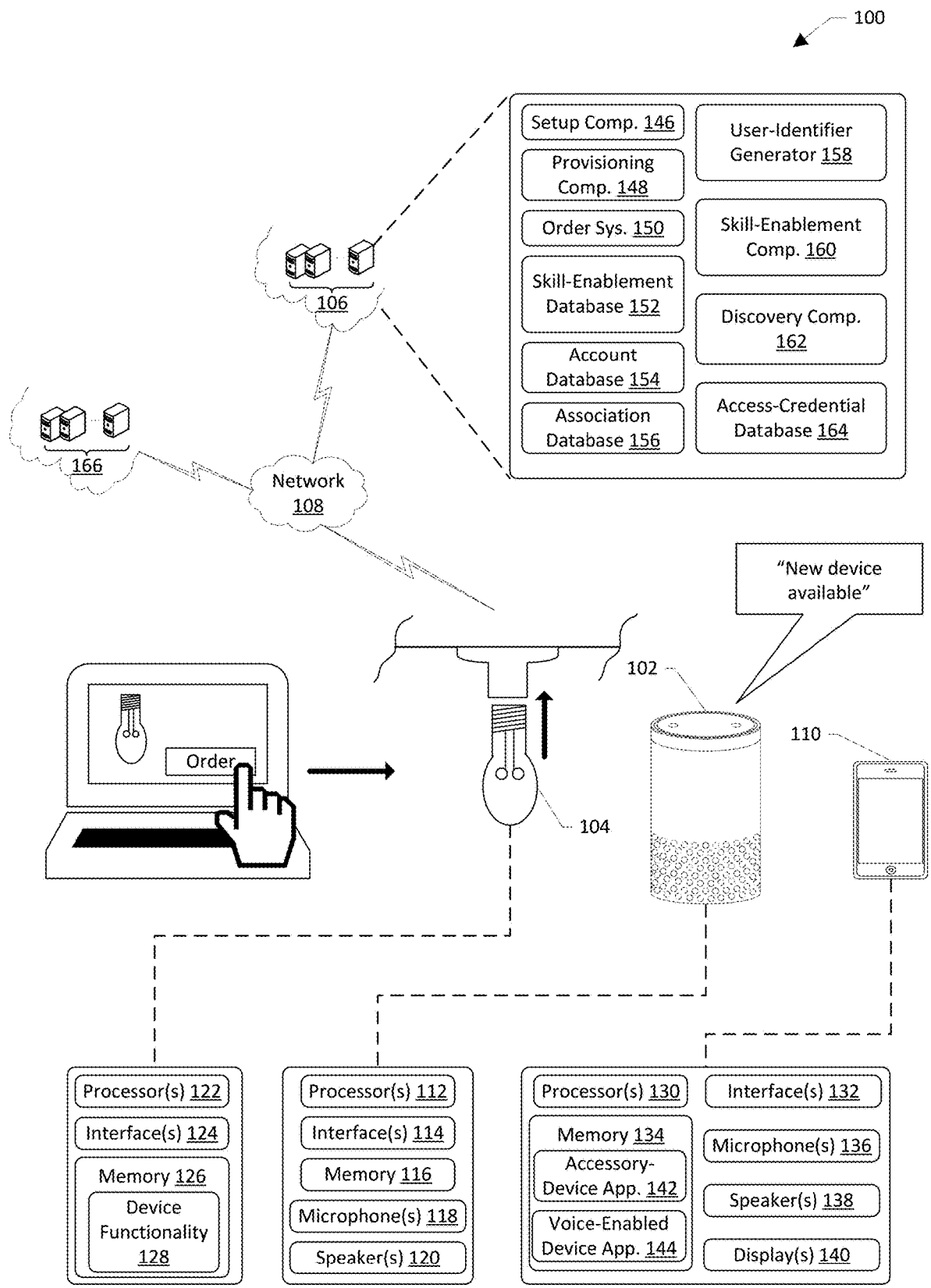
FIG. 1 illustrates a schematic diagram of an example environment for accountless device control.

Systems and methods for accountless device control are disclosed. Take, for example, an environment such as a home where one or more smart devices may be utilized. Users may acquire smart devices, such as utilizing an online marketplace where smart devices are sold, and users may plug in or otherwise provide power to the smart devices to start using them. For at least some of these smart devices, they may include complex systems that utilize a skill or other application associated with a smart-device system to interface between a speech-processing system and the smart device. These smart devices may utilize personal data, when consent to do so has been provided, to operate properly, particularly where the speech-processing system does not store such data or otherwise has access to data that would be useful for operation of the smart device. In examples, the environments may also include one or more voice-enabled devices that may be utilized to control the smart devices via user utterances. For example, a user may speak a user utterance such as "turn on Bedroom Light" and the voice-enabled devices may be utilized to perform one or more commands associated with the user utterance, here causing a smart device such as a smart light bulb and/or smart plug to turn on.

Generally, setup of smart devices is performed by the user and/or one or more systems associated with the smart devices and/or the voice-enabled devices. For example, after plugging in a given smart device, the user may follow a set of instructions provided with the smart device to set up the smart device for use. Those instructions may include downloading a smart-device application on a user's mobile device and/or inputting information about the user, the environment, and/or a network to be utilized in conjunction with the smart device. In these examples, the user is generally instructed to create account data with the smart-device system and register the smart device with the account data. By way of example, some smart devices may include complex systems that utilize a skill or other application associated with a smart-device system to interface between a speech-processing system and the smart device. These smart devices may utilize personal data, when consent to do so has been provided, to operate properly, particularly where the speech-processing system does not store such data or otherwise has access to data that would be useful for operation of the smart device. Additionally, such smart devices may include functionality, preferences, security requirements, etc. that utilize the smart-device system, and in these examples, generation of account data with the smart-device system may be beneficial for operation of the smart device, such as via speech input from a voice-enabled device. Additionally, when the user desires to control the smart device utilizing voice commands, the user provides input to, for example, a voice-enabled-device application associated with the voice-enabled device. This process may include the user downloading or otherwise enabling an application associated with the smart device. This application may otherwise be described herein as a "skill." The skill may be utilized as an interface between a speech processing system's application programming interface ("API") and, in some instances, another smart-device system and/or as the smart-device other system when voice commands are received from the user to cause the smart device to perform one or more operations. In examples, a skill can be used to perform additional functionality associated with a smart device than an application associated with the smart device. Such functionality may include, for example, performing processes on a speech-processing system, performing processes on a user device, exchanging information between the speech-processing system and a smart-device system, etc. A skill may also define support for a user request and the corresponding fulfillment that can carry out the requests. Skills may be configured to fulfill requests with web content, applications associated with user devices, and/or for fulfillment of voice commands such as from a voice-enabled device. Skills may also allow for user customization of actions to be performed in response to voice commands. In total, the setup of smart devices includes several points of user interaction.

The present innovation provides for accountless device control, which in certain examples may allow for fewer points of user interaction to set up and utilize smart devices. For example, a user may acquire a smart device. In some examples, the user may acquire the smart device from a marketplace that sells smart devices. In these examples, during the acquisition process, a graphical user interface associated with the acquisition may be caused to display a request for the user to consent to a frustration-free setup process or otherwise to consent to a system associated with the voice-enabled device performing one or more processes to set up the smart device for use with no or less user interaction. The user may provide input indicating such consent. Data indicating the user consent may be sent to and stored in an order system. The order system may also store information associated with the acquisition of the smart device, such as the account data utilized during the acquisition, the smart device that was acquired, and/or other information associated with the acquisition. Thereafter, the smart device may be shipped to an address provided during the acquisition process. As part of the shipping process, in examples, the package associated with the smart device may be scanned by one or more scanners as part of the normal delivery process. A shipment notification may be generated and may include an order identifier associated with the acquisition of the smart device, an account identifier associated with the account data utilized to acquire the smart device, and/or a public key or other access credential associated with the smart device that was acquired and/or with the smart-device system. In other examples where the smart device is acquired from a physical store, for example, the scanning of the packaging of the smart device may occur during a checkout procedure and information associated with the user and/or the user consent may be obtained during the checkout procedure. For example, a barcode or other user identifier may be received during the checkout procedure, which may allow the system associated with the point-of-sale terminal to associate the user identifier data and the product identifier for the smart device. Additionally, or alternatively, a payment-instrument identifier may be used to associate a user account and the device identifier in examples where the payment-instrument identifier is associated with the user account. The order system may utilize this information along with the indication of consent to set up the smart device to generate pre-registration data associated with the smart device. The pre-registration data may include indications of the account identifier, the user consent, the smart-device system associated with the smart device, the public key, etc.

Thereafter, the smart device may be delivered to the address indicated during acquisition. The user, having received the smart device, may plug in the smart device or otherwise provide power to the smart device, such as utilizing batteries, for example. The smart device may be configured to initiate communication with one or more network access points associated with the environment in which the smart device is disposed. Based at least in part on the user consent described above and/or additional or different user consent, such as consent provided during setup of a voice-enabled device, a setup component of a remote system may be utilized to provide network access credentials to the smart device and/or one or more tokens to allow for the secure exchange of information between the remote system and the smart device and/or between the smart device and the voice-enabled device. The smart device may utilize the network access credentials to gain Internet access. The smart device, having access to the Internet, may send data to the smart-device system indicating that the smart device has come online and is ready to be setup and/or utilized. The smart-device system may send a skill-device association request to the remote system requesting user identifier data to associate with the smart device.

A provisioning component of the remote system may receive the request from the smart-device system and may send a request to a skill-enablement database for an indication of whether a skill has been enabled in association with the user account. For example, a skill associated with the smart-device system may have already been enabled in association with user identifier data corresponding to the user and/or to the account data associated with the user. The user, for example, may have previously acquired and/or set up a smart device that utilizes the skill associated with the smart-device system. In examples where the skill has already been enabled, the provisioning component may respond to the smart-device system with an indication of the user account and/or access tokens to allow for the secure exchange of information between the smart-device system and the remote system with respect to the smart device. However, in other examples, the provisioning component may receive an indication from the skill-enablement database that the skill has not been enabled in association with a user account. In these examples, the provisioning component may request information from the setup component to ensure that the setup component is or has recently performed operations associated with providing network access credentials to the smart device and/or providing one or more security tokens to the smart device. The setup component may return data to the provisioning component indicating that setup of the smart device has been and/or is being performed, along with the requested information described above. The provisioning component may then query the order system to determine whether the user consent described above has been provided to proceed with setup of the smart device.

Having determined that the user consent has been provided, the provisioning component may initiate the process of generating user identifier data to provide to the smart-device system. For example, the provisioning component may send, to an association database, data indicating an association session is pending and information associated with the association session. The information may include the account identifier utilized for purchasing the smart device, an identifier of the skill associated with the smart-device system, and a status of the association session, for example. The provisioning component may then send a request to a user-identifier generator to generate user identifier data for sending to the smart-device system. The user identifier data may be unique to the account data utilized for acquisition of the smart device and the skill associated with the smart-device system. The user-identifier generator may return the user identifier data to the provisioning component, which may then save information associated with the user identifier data in an account database. The information may include the account identifier for the account data utilized to acquire the smart device, the user identifier data generated by the user-identifier generator, the skill identifier, a status of linking the user identifier data to account data provided by the smart-device system, and/or a status of whether the account data provided by the smart-device system has been merged with a user-created account associated with the smart-device system. The provisioning component may then send a response, which may include the user identifier data, to the skill-device association event to the smart-device system. Having received the response, the smart-device system may generate account data to associate with the user device. This account may be described herein as a "shadow account" or "temporary account."

Having generated the temporary account, the smart-device system may send a skill-enablement request to the remote system. The skill-enablement request may include one or more authorization codes generated by an authorization-code generator, information associated with the skill at issue, the user identifier data, and/or one or more access tokens. The provisioning component, having received the skill-enablement request from the smart-device system, may perform one or more security operations before sending a response to the skill-enablement request. For example, the provisioning component may query the user-identifier generator for an indication of whether the user identifier data provided with the skill-enablement request corresponds to user identifier data generated by the user-identifier generator in association with the skill at issue. The user-identifier generator may send a response to the provisioning component indicating that the user identifier data provided with the skill-enablement request corresponds to user identifier data generated by the user-identifier generator in association with the skill. The provisioning component may also query the account database to determine a status of account linking associated with the user identifier data. The account database may return data indicating that account data has not yet been linked to the user identifier data. In these examples, the provisioning component may proceed to requesting skill enablement, such as by a skill-enablement component, of the remote system. It should be understood that while the skill-enablement component is described as a single component, the skill-enablement component may be more than one component. The skill-enablement component may utilize the authorization codes, access tokens, user identifier, and/or skill identifier provided in the skill-enablement request to enable the skill in question. The skill-enablement component may send data to the smart-device system indicating that the skill in question has been enabled in association with the temporary account. The data may include one or more access tokens and/or authorization codes to allow for the secure exchange of information associated with use of the skill. At this point, the temporary account may be linked with the skill associated with the smart-device system.

The remote system may then perform one or more processes for registering the smart device with a smart-home system. For example, the skill-enablement component may publish a skill-link event in a skill-enablement queue of the remote system. The skill-link event may indicate that the skill in question has been linked to a temporary account generated by the smart-device system. The skill-enablement queue may then send a skill event to the provisioning component, where the skill event may include the skill identifier and the temporary account identifier. The provisioning component may query the association database to determine a status of the association session for the smart device and the temporary account. The association database may return an indication that the temporary account has been associated with the skill and the user identifier data, but the temporary account has not yet been registered with the smart-home system. The provisioning component may then generate and/or send a device-association directive to the smart-device system. The device-association directive may include first access tokens that may be utilized by the smart-device system to identify the temporary account at issue. The device-association directive may also include the device identifier of the smart device as maintained by the remote system. The smart-device system, having received the device-association directive, may send a discovery request to the remote system, and specifically to a discovery component of the remote system. The discovery request may include second access tokens that may be utilized by the discovery system to identify account data associated with the voice-enabled device to be utilized for receiving voice commands to perform operations in association with the smart device. The discovery request may also include indications of one or more capabilities of the smart device and/or the identifier of the smart device as maintained by the smart-device system. The discovery component may utilize the discovery request to "discover" or otherwise identify the smart device as a device to be associated with the voice-enabled device and/or the user account associated with the voice-enabled device to enable operation of the smart device via the voice-enabled device.

In examples, the user may also desire to utilize an application associated with the smart-device system, such as when additional and/or different functionality is provided by such an application. In these examples, the user may generate a user account to be associated with the smart device. The device utilized to generate the user account, and/or the smart-device system, may send a notification to the remote system indicating that the user-generated account has been created. The skill-enablement component of the remote system may receive the notification and may initiate a process of merging the temporary account and the user-generated account. For example, one or more access credentials and/or tokens may be updated in the access-credentials database to reflect authorization to communicate with the smart-device system in association with the user-generated account. The skill-enablement component may also publish a skill-link event to the skill-enablement queue indicating that the user-generated account has been created and the user-generated account is to be merged with the temporary account. The skill-enablement queue may then send a skill event to the provisioning component, where the skill event may include the skill identifier for the skill in question and the account identifier. The provisioning component, having received the skill event from the skill-enablement queue, may query the account database to determine a status of the temporary account and whether the temporary account has been merged with another account. In these examples, the temporary account may not yet have been merged and the account database may return a status indicating that the temporary account has not yet been merged. The provisioning component may then query the access-credentials database for the access tokens, which may be retrieved based at least in part on the user identifier data and/or the skill identifier. The access-credentials database may return the access tokens to the provisioning component. The provisioning component may then generate and/or send a merge directive to the smart-device system indicating that the device identifiers associated with the temporary account should be associated with the user-generated account. The merge directive may also include information such as the access tokens and/or the user identifier data to assist in identifying the proper temporary account to be merged and/or to allow for the secure exchange of information in association with the user-generated account.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example system 100 for accountless device control. The system 100 may include, for example, one or more voice-enabled devices 102, one or more smart devices 104, and/or one or more personal devices 110, which may also be described herein as mobile devices 110.

One or more of the voice-enabled devices 102 may be configured to receive user utterances and perform operations in response to such user utterances. In these examples, some of the devices may be "hands free" such that interactions with the devices are performed through audible requests and responses. In other examples, some of the devices may include a display and/or may receive touch input and/or audible input. The voice-enabled devices 102 and the smart devices 104 may be configured to send data to and/or receive data from each other and/or from a remote system 106, such as via a network 108. In examples, the voice-enabled devices 102 and/or the smart devices 104 may communicate directly with the system 106, via the network 108. Additionally, it should be understood that a given space and/or environment may include numerous devices and need not include the same number and/or type of devices illustrated in FIG. 1. It should also be understood that when a "space" or "environment" is used herein, those terms mean an area and not necessarily a given room, building, or other structure, unless otherwise specifically described as such. In examples, an environment may include an area associated with a local area network.

The voice-enabled devices 102 may include one or more components, such as, for example, one or more processors 112, one or more network interfaces 114, memory 116, one or more microphones 118, and/or one or more speakers 120. The microphones 118 may be configured to capture audio, such as user utterances, and generate corresponding audio data. The speakers 120 may be configured to output audio, such as audio corresponding to audio data received from another device and/or the system 106. It should be understood that while several examples used herein include a voice-enabled device 102 that allows users to interact therewith via user utterances, one or more other devices, which may not include a voice interface, may be utilized instead of or in addition to voice-enabled devices 102. In these examples, the device may be configured to send and receive data over the network 108 and to communicate with other devices in the system 100.

The smart devices 104 may include one or more components, such as, for example, one or more processors 122, one or more network interfaces 124, and/or memory 126. The memory 126 may include components such as, for example, a device functionality component 128. The memory 126 and/or processors 122 may be utilized to cause certain operations to be performed by the smart devices 104, such as activating and/or deactivating the device functionality 128 of the smart device 104. The device functionality 128 may include components associated with the intended use of the smart devices 104. For example, one of the smart devices 104 may be a light bulb, and in this example, the device functionality components 128 may include a filament and/or light emitting diode that may produce and/or emit light. By way of further example, another smart device 104 may be a wall plug, and in this example, the device functionality components 128 may include an "on/off mechanism" for causing electricity to flow or not flow to a device that is plugged in to the wall plug. It should be noted that the device functionalities illustrated here are by way of example only. While the smart device 104 depicted in FIG. 1 is a light bulb, it should be understood that the smart device 104 may be any smart device or otherwise an Internet-of-things device, such as, for example, a watch, a set top box, a doorbell, a camera, an appliance, a television, a thermostat, a smart plug, a smart light bulb, a clock, a lock, etc. Additionally, in examples, while certain smart devices may be smart-home devices that are associated with a residential environment, the smart devices may include devices other than those found typically in residential environments. For example, the smart devices may include devices found in work or other environments outside of a residence. Such smart devices may include medical equipment, transportation hubs, point-of-sale devices, registers, manufacturing equipment, access-control devices, etc.

The memory 126 of the smart device 104 may include a private encryption key. For example, a private encryption key known to the smart device 104 and, in examples, the smart-device system 166, may be stored in association with the memory 126 and may be utilized by the smart device 104 to generate a digital signature associated with token data, as described elsewhere herein. The private encryption key may be a cryptographic key which may represent a string of numbers and/or letters. The private encryption key may be utilized to decrypt information encrypted with a corresponding public encryption key, or vice versa. The key encryption described herein may be utilized to authenticate and encrypt/decrypt data transferred between the remote system 106 and the smart-device system 166. For example, the remote system 106 may have access to the public encryption key for the system 166 associated with the smart device 104. The system 166 associated with the smart device 104 may have provided the public encryption key prior to the processes described herein, for example. The remote system 106 may determine that the token data has been signed and may, utilizing the public encryption key, decrypt the token data to identify the device identifier of the device at issue.

The mobile device 110 may include one or more components, such as, for example, one or more processors 130, one or more network interfaces 132, memory 134, one or more microphones 136, one or more speakers 138, and/or one or more displays 140. The microphones 136 and the speakers 138 may have the same or similar components and/or may operate in the same or a similar manner to the microphones 118 and the speakers 120 of the voice-enabled device 102, respectively. The memory 134 may include one or more components such as, for example, a smart-device application 142 and/or a voice-enabled device application 144, which may reside on the memory 134 and/or be accessible to the mobile device 110. The applications(s) 142, 144 may be configured to cause the processor(s) 130 to receive information associated with interactions with the voice-enabled device 102 and cause display of representations, such as text and/or images, associated with the interactions. The application(s) 142, 144 may also be utilized, in examples, to receive input data, such as from a user of the mobile device 110, and send the input data and/or instructions associated with the input data to the remote system 106. The application(s) 142, 144 may also be utilized to display notifications and/or alerts received, for example, from the remote system 106.

The remote system 106 may include components such as, for example, a setup component 146, a provisioning component 148, an order system 150, a skill-enablement database 152, an account database 154, an association database 156, a user-identifier 158, a skill-enablement component 160, a discovery component 162, and/or an access-credential database 164. Additional components of the remote system may include, for example, a speech-processing system and/or a smart-home speechlet. It should be understood that while the speech-processing system and the other components may be described and/or be depicted as separate from each other, some or all of the components may be a part of the same system. The speech-processing system may include an automatic speech recognition component (ASR) and/or a natural language understanding component (NLU). Each of the components described herein with respect to the remote system 106 may be associated with their own systems, which collectively may be referred to herein as the remote system 106, and/or some or all of the components may be associated with a single system. Additionally, the remote system 106 may include one or more applications, which may be described as skills. "Skills," as described herein may be applications and/or may be a subset of an application. For example, a skill may receive data representing an intent. For example, an intent may be determined by the NLU component and/or as determined from user input via a computing device. Skills may be configured to utilize the intent to output data for input to a TTS component, a link or other resource locator for audio data, and/or a command to a device, such as the smart devices 104.

Skills may extend the functionality of some or all devices associated with the system 100 that can be controlled by users utilizing a voice-user interface. In some examples, skills may be a type of application that may be useable in association with smart devices 104 and may have been developed specifically to work in connection with given smart devices 104. Additionally, skills may be a type of application that may be useable in association with the voice-enabled device 102 and may have been developed specifically to provide given functionality to the voice-enabled device 102. In examples, a non-skill application may be an application that does not include the functionality of a skill. Speechlets, as described herein, may be a type of application that may be usable in association with voice-enabled devices 102 and may have been developed specifically to work in connection with voice interfaces of voice-enabled devices 102. The application(s) may be configured to cause processor(s) to receive information associated with interactions with the smart devices 104. The application(s) may also be utilized, in examples, to receive input, such as from a user of a mobile device 110 and/or the smart devices 104, and send data and/or instructions associated with the input to one or more other devices. In examples, a skill can be used to perform additional functionality associated with a smart device than an application associated with the smart device. Such functionality may include, for example, performing processes on a speech-processing system, performing processes on a user device, exchanging information between the speech-processing system and a smart-device system, etc. A skill may also define support for a user request and the corresponding fulfillment that can carry out the requests. Skills may be configured to fulfill requests with web content, applications associated with user devices, and/or for fulfillment of voice commands such as from a voice-enabled device. Skills may also allow for user customization of actions to be performed in response to voice commands.

In examples, some or each of the components of the remote system 106 may include their own processor(s), network interface(s), and/or memory. As such, by way of example, the speech-processing system may include and/or be associated with processor(s), network interface(s), and/or memory. The smart-home speechlet may include and/or be associated with different processor(s), network interface(s), and/or memory, or one or more of these components may utilize some or all of the same processor(s), network interface(s), and/or memory utilized by the speech-processing system. These components are described in detail below: Additionally, the operations and/or functionalities associated with and/or described with respect to the components of the remote system 106 may be performed utilizing cloud-based computing resources. For example, web-based systems such as Elastic Compute Cloud systems or similar systems may be utilized to generate and/or present a virtual computing environment for performance of some or all of the functionality described herein. Additionally, or alternatively, one or more systems that may be configured to perform operations without provisioning and/or managing servers, such as a Lambda system or similar system, may be utilized.

The speech-processing system may be configured to receive audio data from the devices and to perform speech-processing operations. For example, the ASR component may be configured to generate text data corresponding to the audio data, and the NLU component may be configured to generate intent data corresponding to the audio data. In examples, intent data may be generated that represents the audio data, such as without the generation and/or use of text data. The intent data may indicate a determined intent associated with the user utterance as well as a payload and/or value associated with the intent. Speechlets, as described herein may otherwise be described as applications and may include functionality for utilizing intent data to generate directives and/or instructions. For example, a smart-home speechlet may be called when the intent indicates that an action is to be performed associated with operation of a smart device 104. The speechlet may be designated as being configured to handle the intent of controlling smart devices 104, for example. The speechlet may receive the intent data and/or other data associated with the user utterance from the NLU component, such as by an orchestrator of the remote system 106, and may perform operations to instruct devices to perform an operation. For example, the smart-home speechlet may cause other components of the system 106 to generate a directive to operate a smart device 104. The remote system 106 may generate audio data confirming that the request was received and/or that the smart device 104 will be controlled, such as by a text-to-speech component.

The other components of the remote system 106 will be described below by way of example. For example, a user may acquire a smart device 104. In some examples, such as depicted in FIG. 1, the user may acquire the smart device 104 from an online marketplace that sells smart devices 104. FIG. 1 illustrates a user operating a computing device to order a smart light bulb smart device 104. It should be understood that while several examples of a marketplace from which smart devices may be acquired are described as online marketplaces, this disclosure includes any type of marketplace, including for example online marketplaces and physical marketplaces. Additionally, a marketplace may not be utilized and instead any transfer of possession of the smart devices at issue may be utilized to determine if a user account associated with a speech-processing system may be identified in association with the transfer of possession. Examples of possession transfer may include transferring a smart device from a seller to a purchaser, from a loaner to a loanee, from a lessor to a lessee, etc. In these examples, during the acquisition process, a graphical user interface associated with the acquisition may be caused to display a request for the user to consent to a frustration-free setup process or otherwise to consent to a system associated with the voice-enabled device 102 to perform one or more processes to setup the smart device 104 for use with no or less user interaction. The user may provide input indicating such consent. Data indicating the user consent may be sent to and stored in the order system 150. The order system 150 may also store information associated with the acquisition of the smart device 104, such as the account data utilized during the acquisition, the smart device 104 that was acquired, and/or other information associated with the acquisition. Thereafter, the smart device 104 may be shipped to an address provided during the acquisition process. As part of the shipping process, in examples, the package associated with the smart device 104 may be scanned by one or more scanners as part of the normal delivery process. A shipment notification may be generated and may include an order identifier associated with the acquisition of the smart device 104, an account identifier associated with the account data utilized to acquire the smart device 104, and/or a public key or other access credential associated with the smart device 104 that was acquired and/or with a smart-device system 166. The order system 150 may utilize this information along with the indication of consent to set up the smart device 104 to generate pre-registration data associated with the smart device 104. The pre-registration data may include indications of the account identifier, the user consent, the smart-device system 166 associated with the smart device 104, the public key, etc.

Thereafter, the smart device 104 may be delivered to the address indicated during acquisition. The user, having received the smart device 104, may plug in the smart device 104 or otherwise provide power to the smart device 104, such as utilizing batteries, for example. The smart device 104 may be configured to initiate communication with one or more network access points associated with the environment in which the smart device 104 is disposed. In these examples, when the smart device 104 is plugged in or otherwise acquires power such that the network interface of the smart device 104 is capable of wirelessly communicating with one or more other devices, the smart device 104 may send a signal that may be received by the voice-enabled device 102. In other examples, the voice-enabled device 102 may send a signal periodically, on a scheduled basis, and/or randomly that may be received by the smart device 104. The smart device 104, in these examples, may send a return signal. The voice-enabled device 102 may identify the smart device 104 and/or data associated with the signal received from the smart device 104 may be sent to the remote system 106, which may identify the smart device 104 and send return data including, for example, network access credentials associated with establishing wireless communication between the smart device 104 and the voice-enabled device 102. The voice-enabled device 102 and/or the smart device 104 may utilize the network access credentials to allow the smart device 104 to communicate with the voice-enabled device 102 and/or one or more other devices over the network 108.

Additionally, the setup component 146 may generate token data for setting up the smart device 104 in association with the voice-enabled device 102 and/or the remote system 106. The token data may indicate the device identifier of the smart device 104 as provided by the smart device 104 and the voice-enabled device 102 associated with network 108 on which the smart device 104 is communicating. The network access credentials, the token data, and, in examples, a device identifier provided by the remote system 106 for the smart device 104 may be sent from the remote system 106 to the smart device 104, such as via the network 108. The voice-enabled device 102 and/or the smart device 104 may utilize the network access credentials to allow the smart device 104 to connect to the network 108 and communicate with the voice-enabled device 102 and/or one or more other devices over the network 108.

The smart device 104, having access to the Internet, may send data to the smart-device system 166 indicating that the smart device 104 has come online and is ready to be setup and/or utilized. The smart-device system 166 may send a skill-device association request to the remote system 106 requesting user identifier data to associate with the smart device 104.

The provisioning component 148 of the remote system 106 may receive the request from the smart-device system 166 and may send a request to the skill-enablement database 152 for an indication of whether a skill has been enabled in association with the user account. For example, a skill associated with the smart-device system 166 may have already been enabled in association with user identifier data corresponding to the user and/or to the account data associated with the user. The user, for example, may have previously acquired and/or setup a smart device 104 that utilizes the skill associated with the smart-device system 166. In examples where the skill has already been enabled, the provisioning component 148 may respond to the smart-device system 166 with an indication of the user account and/or access tokens to allow for the secure exchange of information between the smart-device system 166 and the remote system 106 with respect to the smart device 104. However, in other examples, the provisioning component 148 may receive an indication from the skill-enablement database 152 that the skill has not been enabled in association with a user account. In these examples, the provisioning component 148 may request information from the setup component 146 to ensure that the setup component 146 is or has recently performed operations associated with providing network access credentials to the smart device 104 and/or providing one or more security tokens to the smart device 104. The setup component 146 may return data to the provisioning component 148 indicating that setup of the smart device 104 has been and/or is being performed, along with the requested information described above. The provisioning component 148 may then query the order system 150 to determine whether the user consent described above has been provided to proceed with setup of the smart device 104.

Having determined that the user consent has been provided, the provisioning component 148 may initiate the process of generating user identifier data to provide to the smart-device system 166. For example, the provisioning component 148 may send, to the association database 156, data indicating an association session is pending and information associated with the association session. The information may include the account identifier utilized for purchasing the smart device 104, an identifier of the skill associated with the smart-device system 166, and a status of the association session, for example. The provisioning component 148 may then send a request to a user-identifier generator 158 to generate user identifier data for sending to the smart-device system 166. The user identifier data may be unique to the account data utilized for acquisition of the smart device 104 and the skill associated with the smart-device system 166. The user-identifier generator 158 may return the user identifier data to the provisioning component 148, which may then save information associated with the user identifier data in the account database 154. The information may include the account identifier for the account data utilized to acquire the smart device 104, the user identifier data generated by the user-identifier generator 158, the skill identifier, a status of linking the user identifier data to account data provided by the smart-device system 166, and/or a status of whether the account data provided by the smart-device system 166 has been merged with a user-created account associated with the smart-device system 166. The provisioning component 148 may then send a response, which may include the user identifier data, to the skill-device association event to the smart-device system 166. Having received the response, the smart-device system 166 may generate account data to associate with the user device. This account may be described herein as a "shadow account" or "temporary account."

Having generated the temporary account, the smart-device system 166 may send a skill-enablement request to the remote system 106. The skill-enablement request may include one or more authorization codes generated by an authorization-code generator, information associated with the skill at issue, the user identifier data, and/or one or more access tokens. The provisioning component 148, having received the skill-enablement request from the smart-device system 166, may perform one or more security operations before sending a response to the skill-enablement request. For example, the provisioning component 148 may query the user-identifier generator 158 for an indication of whether the user identifier data provided with the skill-enablement request corresponds to user identifier data generated by the user-identifier generator 158 in association with the skill at issue. The user-identifier generator 158 may send a response to the provisioning component 148 indicating that the user identifier data provided with the skill-enablement request corresponds to user identifier data generated by the user-identifier generator 158 in association with the skill. The provisioning component 148 may also query the account database 154 to determine a status of account linking associated with the user identifier data. The account database 154 may return data indicating that account data has not yet been linked to the user identifier data. In these examples, the provisioning component 148 may proceed to requesting skill enablement, such as by the skill-enablement component 160, of the remote system 106. It should be understood that while the skill-enablement component 160 is described as a single component, the skill-enablement component 160 may be more than one component. The skill-enablement component 160 may utilize the authorization codes, access tokens, user identifier, and/or skill identifier provided in the skill-enablement request to enable the skill in question. The skill-enablement component may send data to the smart-device system 166 indicating that the skill in question has been enabled in association with the temporary account. The data may include one or more access tokens and/or authorization codes to allow for the secure exchange of information associated with use of the skill with the smart-device system 166. At this point, the temporary account may be linked with the skill associated with the smart-device system 166.

The remote system 106 may then perform one or more processes for registering the smart device 104 with the smart-home system. For example, the skill-enablement component 160 may publish a skill-link event in a skill-enablement queue of the remote system 106. The skill-link event may indicate that the skill in question has been linked to a temporary account generated by the smart-device system 166. The skill-enablement queue may then send a skill event to the provisioning component 148, where the skill event may include the skill identifier and the temporary account identifier. The provisioning component 148 may query the association database 156 to determine a status of the association session for the smart device 104 and the temporary account. The association database 156 may return an indication that the temporary account has been associated with the skill and the user identifier data, but the temporary account has not yet been registered with the smart-home system of the remote system 106. The provisioning component 148 may then generate and/or send a device-association directive to the smart-device system 166. The device-association directive may include first access tokens that may be utilized by the smart-device system 166 to identify the temporary account at issue. The device-association directive may also include the device identifier of the smart device 104 as maintained by the remote system 106. The smart-device system 166, having received the device-association directive, may send a discovery request to the remote system 106, and specifically to the discovery component 162 of the remote system 106. The discovery request may include second access tokens that may be utilized by the discovery component 162 to identify account data associated with the voice-enabled device 102 to be utilized for receiving voice commands to perform operations in association with the smart device 104. The discovery request may also include indications of one or more capabilities of the smart device 104 and/or the identifier of the smart device 104 as maintained by the smart-device system 166. The discovery component 162 may utilize the discovery request to "discover" or otherwise identify the smart device 104 as a device to be associated with the voice-enabled device 102 and/or the user account associated with the voice-enabled device 102 to enable operation of the smart device 104 via the voice-enabled device 102.

The processes described herein above may result in the smart device 104 being operable by the voice-enabled device 102 and/or by an application 144 associated with the voice-enabled device 102, such as using the mobile device 110 associated with the user. However, the user may also desire to utilize the smart-device application 142 associated with the smart-device system 166, such as when additional and/or different functionality is provided by such an application 142. In these examples, the user may generate a user account to be associated with the smart device 104. The device utilized to generate the user account, and/or the smart-device system 166, may send a notification to the remote system 106 indicating that the user-generated account has been created. The skill-enablement component 160 of the remote system 106 may receive the notification and may initiate a process of merging the temporary account and the user-generated account. For example, one or more access credentials and/or tokens may be updated in the access-credentials database 164 to reflect authorization to communicate with the smart-device system 166 in association with the user-generated account. The skill-enablement component 160 may also publish a skill-link event to the skill-enablement queue indicating that the user-generated account has been created and the user-generated account is to be merged with the temporary account. The skill-enablement queue may then send a skill event to the provisioning component 148, where the skill event may include the skill identifier for the skill in question and the account identifier. The provisioning component 148, having received the skill event from the skill-enablement queue, may query the account database 154 to determine a status of the temporary account and whether the temporary account has been merged with another account. In these examples, the temporary account may not yet have been merged and the account database 154 may return a status indicating that the temporary account has not yet been merged. The provisioning component 148 may then query the access-credentials database 164 for the access tokens, which may be retrieved based at least in part on the user identifier data and/or the skill identifier. The access-credentials database 164 may return the access tokens to the provisioning component 148. The provisioning component 148 may then generate and/or send a merge directive to the smart-device system 166 indicating that the device identifiers associated with the temporary account should be associated with the user-generated account. The merge directive may also include information such as the access tokens and/or the user identifier data to assist in identifying the proper temporary account to be merged and/or to allow for the secure exchange of information in association with the user-generated account.

It should be noted that while text data is described as a type of data utilized to communicate between various components of the remote system 106 and/or other systems and/or devices, the components of the remote system 106 may use any suitable format of data to communicate. For example, the data may be in a human-readable format, such as text data formatted as XML, SSML, and/or other markup language, or in a computer-readable format, such as binary, hexadecimal, etc., which may be converted to text data for display by one or more devices.

It should be noted that the exchange of data and/or information as described herein may be performed only in situations where a user has provided consent for the exchange of such information. For example, upon setup of devices and/or initiation of applications, a user may be provided with the opportunity to opt in and/or opt out of data exchanges between devices and/or for performance of the functionalities described herein. Additionally, when one of the devices is associated with a first user account and another of the devices is associated with a second user account, user consent may be obtained before performing some, any, or all of the operations and/or processes described herein. Additionally, the operations performed by the components of the systems described herein may be performed only in situations where a user has provided consent for performance of the operations.

As used herein, a processor, such as processor(s) 112, 122, 130, and/or the processor(s) described with respect to the components of the remote system 106, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 112, 122, 130, and/or the processor(s) described with respect to the components of the remote system 106 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 112, 122, 130, and/or the processor(s) described with respect to the components of the remote system 106 may possess its own local memory, which also may store program components, program data, and/or one or more operating systems.

The memory 116, 126, 134, and/or the memory described with respect to the components of the remote system 106 may include volatile and nonvolatile memory, removable and non-removable media implemented in any method or technology for storage of information, such as computer-readable instructions, data structures, program component, or other data. Such memory 116, 126, 134, and/or the memory described with respect to the components of the remote system 106 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 116, 126, 134, and/or the memory described with respect to the components of the remote system 106 may be implemented as computer-readable storage media ("CRSM"), which may be any available physical media accessible by the processor(s) 112, 122, 130, and/or the processor(s) described with respect to the remote system 106 to execute instructions stored on the memory 116, 126, 134, and/or the memory described with respect to the components of the remote system 106. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 116, 126, 134, and/or the memory described with respect to the components of the remote system 106, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project: other UNIX or UNIX-like variants: a variation of the Linux operating system as promulgated by Linus Torvalds: the FireOS operating system from Amazon.com Inc. of Seattle, Washington, USA: the Windows operating system from Microsoft Corporation of Redmond, Washington, USA: LynxOS as promulgated by Lynx Software Technologies, Inc. of San Jose, California: Operating System Embedded (Enea OSE) as promulgated by ENEA AB of Sweden; and so forth.

The network interface(s) 114, 124, 132, and/or the network interface(s) described with respect to the components of the remote system 106 may enable messages between the components and/or devices shown in system 100 and/or with one or more other polling systems, as well as other networked devices. Such network interface(s) 114, 124, 132, and/or the network interface(s) described with respect to the components of the remote system 106 may include one or more network interface controllers (NICs) or other types of transceiver devices to send and receive messages over the network 108.

For instance, each of the network interface(s) 114, 124, 132, and/or the network interface(s) described with respect to the components of the remote system 106 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 114, 124, 132, and/or the network interface(s) described with respect to the components of the remote system 106 may include a wide area network (WAN) component to enable message over a wide area network.

While various components of the remote system 106 have been labeled and named in this disclosure and each component has been described as being configured to cause the processor(s) to perform certain operations, it should be understood that the described operations may be performed by some or all of the components and/or other components not specifically illustrated.

Figure 2:
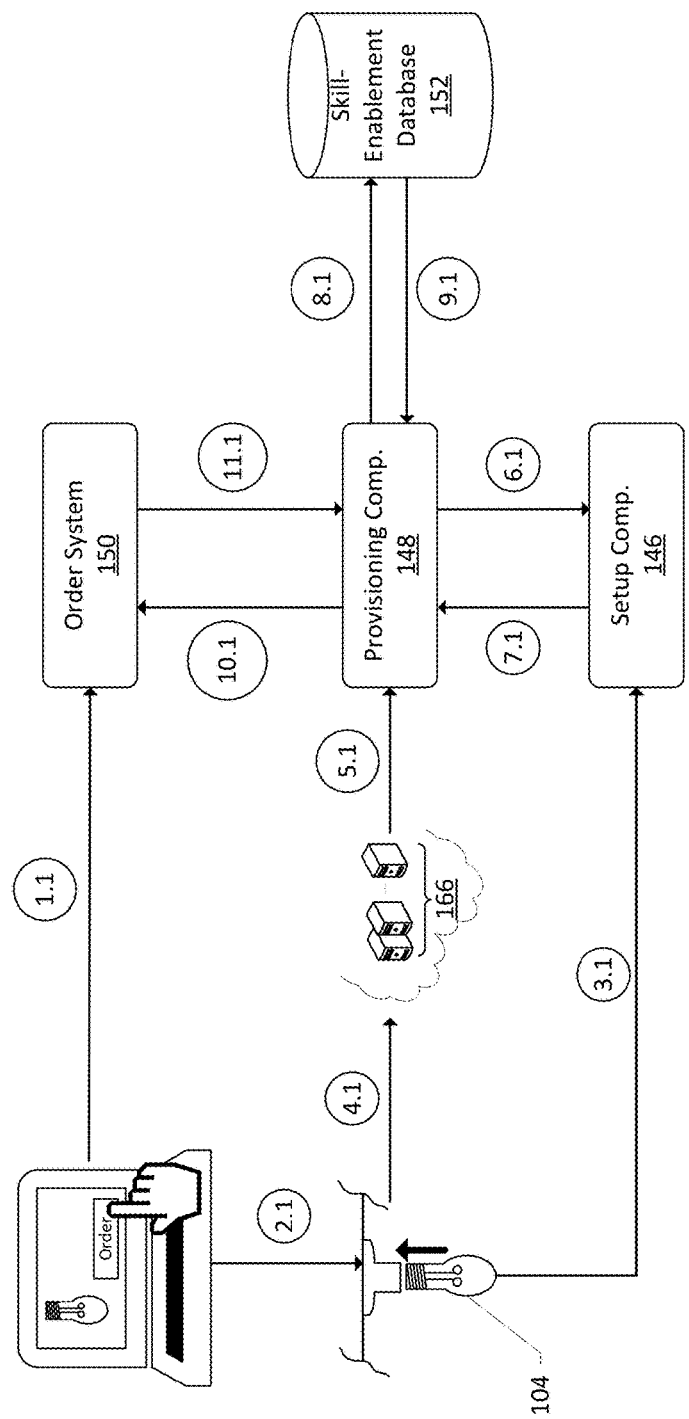
FIG. 2 illustrates a conceptual diagram of example components of a system utilized for receiving an indication of user consent to associate a smart device with an application.

FIG. 2 illustrates a conceptual diagram of example components of a system 200 utilized for receiving an indication of user consent to associate a smart device 104 with a skill associated with the smart device 104. The system 200 may include at least a portion of the system 100 described with respect to FIG. 1. For example, the system 200 may include a smart device 104, a smart-device system 166, and components of a remote system 106, such as a provisioning component 148, an order system 150, a setup component 146, and/or a skill-enablement database 152. The components are shown and described using steps 1-11, as illustrated in FIG. 2. It should be understood that while steps 1.1-11.1 are described in sequential order, some or all of the operations may be performed in an order other than that described herein and/or some or all of the operations may be performed in parallel. For example, a user may acquire a smart device 104. In some examples, such as depicted in FIG. 2, the user may acquire the smart device 104 from an online marketplace that sells smart devices 104. FIG. 2 illustrates a user operating a computing device to order a smart light bulb smart device 104. In these examples, during the acquisition process, a graphical user interface associated with the acquisition may be caused to display a request for the user to consent to a frustration-free setup process or otherwise to consent to a system associated with a voice-enabled device 102 to perform one or more processes to setup the smart device 104 for use with no or less user interaction. The user may provide input indicating such consent.

At step 1.1, data indicating the user consent may be sent to and stored in the order system 150. The order system 150 may also store information associated with the acquisition of the smart device 104, such as the account data utilized during the acquisition, the smart device 104 that was acquired, and/or other information associated with the acquisition. At step 2.1, the smart device 104 may be shipped to an address provided during the acquisition process. As part of the shipping process, in examples, the package associated with the smart device 104 may be scanned by one or more scanners as part of the normal delivery process. A shipment notification may be generated and may include an order identifier associated with the acquisition of the smart device 104, an account identifier associated with the account data utilized to acquire the smart device 104, and/or a public key or other access credential associated with the smart device 104 that was acquired and/or with a smart-device system 166. The order system 150 may utilize this information along with the indication of consent to set up the smart device 104 to generate pre-registration data associated with the smart device 104. The pre-registration data may include indications of the account identifier, the user consent, the smart-device system 166 associated with the smart device 104, the public key, etc. Thereafter, the smart device 104 may be delivered to the address indicated during acquisition. The user, having received the smart device 104, may plug in the smart device 104 or otherwise provide power to the smart device 104, such as utilizing batteries, for example.

At step 3.1, the smart device 104 may be configured to initiate communication with one or more network access points associated with the environment in which the smart device 104 is disposed. Based at least in part on the user consent described above and/or additional or different user consent, such as consent provided during setup of a voice-enabled device 102, the setup component 146 of a remote system 106 may be utilized to provide network access credentials to the smart device 104 and/or one or more tokens to allow for the secure exchange of information between the remote system 106 and the smart device 104 and/or between the smart device 104 and the voice-enabled device 102. The smart device 104 may utilize the network access credentials to gain Internet access.

At step 4.1, the smart device 104, having access to the Internet, may send data to the smart-device system 166 indicating that the smart device 104 has come online and is ready to be setup and/or utilized At step 5.1, the smart-device system 166 may send a skill-device association request to the remote system 106 requesting user identifier data to associate with the smart device 104.

At step 6.1, the provisioning component 148 may request information from the setup component 146 to ensure that the setup component 146 is or has recently performed operations associated with providing network access credentials to the smart device 104 and/or providing one or more security tokens to the smart device 104. At step 7.1, the setup component 146 may return data to the provisioning component 148 indicating that setup of the smart device 104 has been and/or is being performed, along with the requested information described above.

At step 8.1, may send a request to the skill-enablement database 152 for an indication of whether a skill has been enabled in association with the user account. For example, a skill associated with the smart-device system 166 may have already been enabled in association with user identifier data corresponding to the user and/or to the account data associated with the user. The user, for example, may have previously acquired and/or setup a smart device 104 that utilizes the skill associated with the smart-device system 166. In examples where the skill has already been enabled, the provisioning component 148 may respond to the smart-device system 166 with an indication of the user account and/or access tokens to allow for the secure exchange of information between the smart-device system 166 and the remote system 106 with respect to the smart device 104. However, in other examples, at step 9.1, the provisioning component 148 may receive an indication from the skill-enablement database 152 that the skill has not been enabled in association with a user account.

At step 10.1, the provisioning component 148 may query the order system 150 to determine whether the user consent described above has been provided to proceed with setup of the smart device 104. At step 11.1, the order system 150 may send data indicating that the user consent has been given to proceed with setup of the smart device 104.

Figure 3:
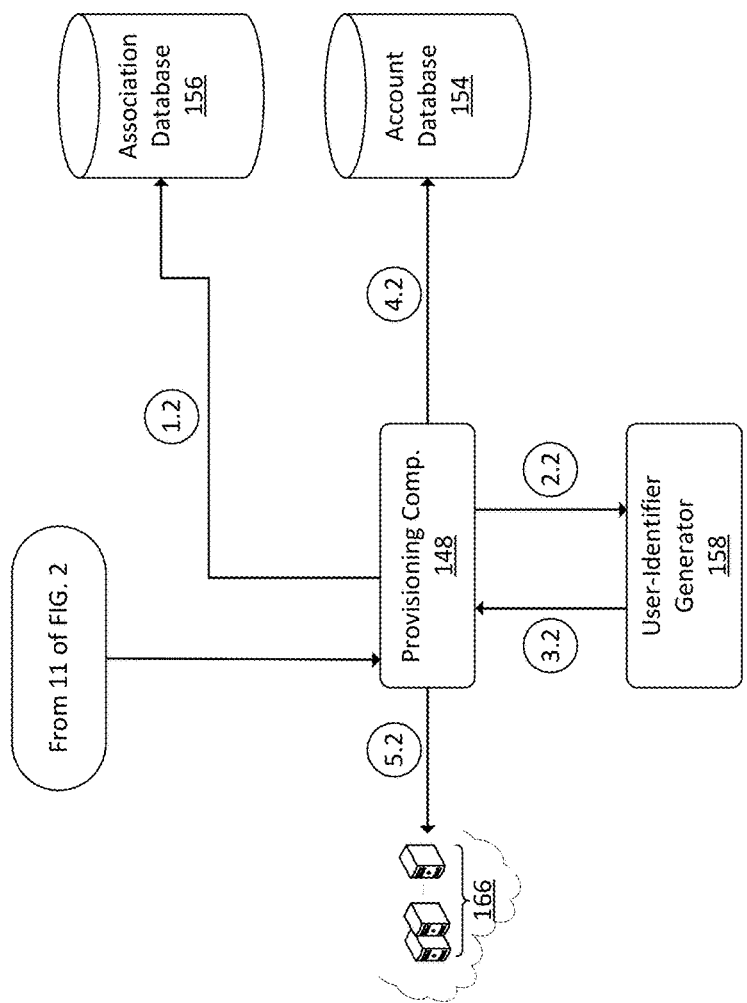
FIG. 3 illustrates a conceptual diagram of example components of a system utilized for generation of user identifier data to be utilized by a smart-device system for accountless device control.

FIG. 3 illustrates a conceptual diagram of example components of a system 300 utilized for generation of user identifier data to be utilized by a smart-device system 166 for accountless device control. The system 300 may include at least a portion of the system 100 described with respect to FIG. 1. For example, the system 300 may include a smart-device system 166 and components of a remote system 106, such as a provisioning component 148, an association database 156, an account database 154, and/or a user-identifier generator 158. The components are shown and described using steps 1.2-5.2, as illustrated in FIG. 3. It should be understood that while steps 1.2-5.2 are described in sequential order, some or all of the operations may be performed in an order other than that described herein and/or some or all of the operations may be performed in parallel. It should be understood that the processes described with respect to FIG. 3 may be based at least in part on one or more of the processes described with respect to FIG. 2. It should also be understood that the processes described with respect to step 1.2 of FIG. 3 may be performed in response to and/or based at least in part on the result of step 11.1 from FIG. 2.

At step 1.2, having determined that the user consent has been provided, the provisioning component 148 may initiate the process of generating user identifier data to provide to the smart-device system 166. For example, the provisioning component 148 may send, to the association database 156, data indicating an association session is pending and information associated with the association session. The information may include the account identifier utilized for purchasing the smart device 104, an identifier of the skill associated with the smart-device system 166, and a status of the association session, for example.

At step 2.2, the provisioning component 148 may send a request to a user-identifier generator 158 to generate user identifier data for sending to the smart-device system 166. The user identifier data may be unique to the account data utilized for acquisition of the smart device 104 and the skill associated with the smart-device system 166. At step 3.2, the user-identifier generator 158 may return the user identifier data to the provisioning component 148. At step 4.2, the provisioning component 148 may save information associated with the user identifier data in the account database 154. The information may include the account identifier for the account data utilized to acquire the smart device 104, the user identifier data generated by the user-identifier generator 158, the skill identifier, a status of linking the user identifier data to account data provided by the smart-device system 166, and/or a status of whether the account data provided by the smart-device system 166 has been merged with a user-created account associated with the smart-device system 166.

At step 5.2, the provisioning component 148 may then send a response, which may include the user identifier data, to the skill-device association event to the smart-device system 166. Having received the response, the smart-device system 166 may generate account data to associate with the user device. This account may be described herein as a "shadow account" or "temporary account."

Figure 4:
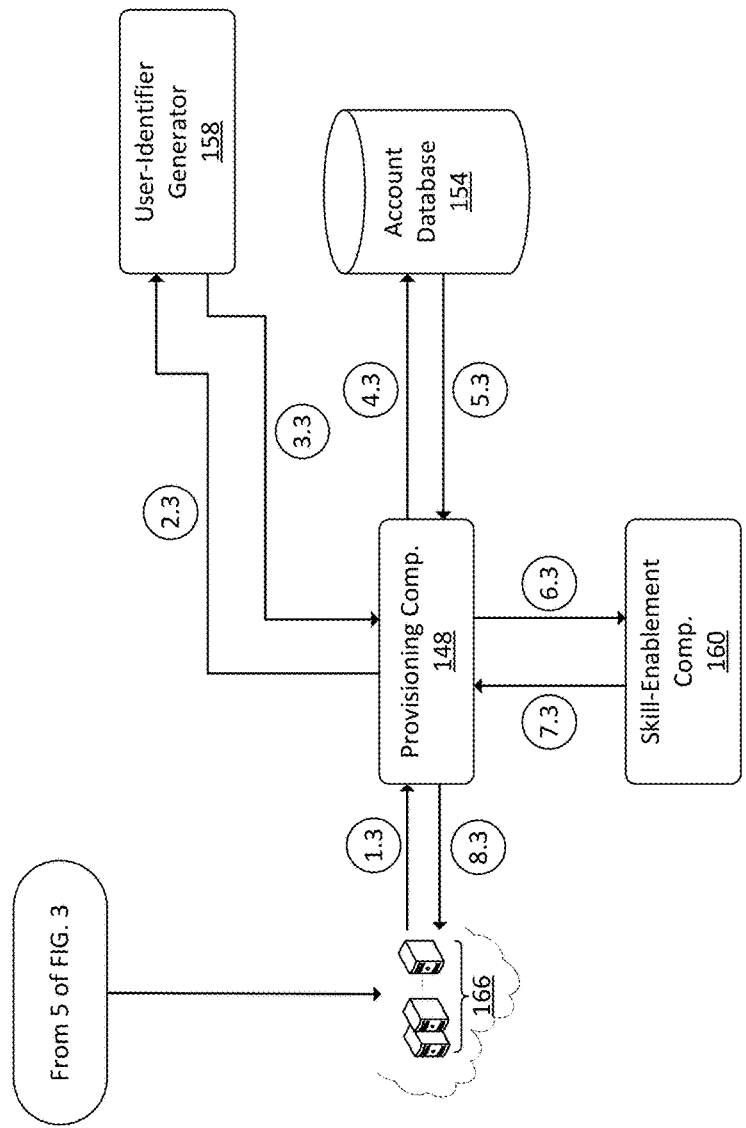
FIG. 4 illustrates a conceptual diagram of example components of a system for enabling an application for use with a smart device utilizing account data generated by a smart-device system.

FIG. 4 illustrates a conceptual diagram of example components of a system 400 for enabling an application for use with a smart device 104 utilizing account data generated by a smart-device system 166. The system 400 may include at least a portion of the system 100 described with respect to FIG. 1. For example, the system 400 may include a smart-device system 166 and components of a remote system 106, such as a provisioning component 148, an account database 154, a skill-enablement component 160, and/or a user-identifier generator 158. The components are shown and described using steps 1.3-8.3, as illustrated in FIG. 4. It should be understood that while steps 1.3-8.3 are described in sequential order, some or all of the operations may be performed in an order other than that described herein and/or some or all of the operations may be performed in parallel. It should be understood that the processes described with respect to FIG. 4 may be based at least in part on one or more of the processes described with respect to FIG. 3. It should also be understood that the processes described with respect to step 1.3 of FIG. 4 may be performed in response to and/or based at least in part on the result of step 5.2 from FIG. 3.

At step 1.3, having generated the temporary account, the smart-device system 166 may send a skill-enablement request to the remote system 106. The skill-enablement request may include one or more authorization codes generated by an authorization-code generator, information associated with the skill at issue, the user identifier data, and/or one or more access tokens.

At step 2.3, the provisioning component 148, having received the skill-enablement request from the smart-device system 166, may perform one or more security operations before sending a response to the skill-enablement request. For example, the provisioning component 148 may query the user-identifier generator 158 for an indication of whether the user identifier data provided with the skill-enablement request corresponds to user identifier data generated by the user-identifier generator 158 in association with the skill at issue. At step 3.3, the user-identifier generator 158 may send a response to the provisioning component 148 indicating that the user identifier data provided with the skill-enablement request corresponds to user identifier data generated by the user-identifier generator 158 in association with the skill.

At step 4.3, the provisioning component 148 may query the account database 154 to determine a status of account linking associated with the user identifier data. At step 5.3, the account database 154 may return data indicating that account data has not yet been linked to the user identifier data.

At step 6.3, the provisioning component 148 may request skill enablement, such as by the skill-enablement component 160, of the remote system 106. It should be understood that while the skill-enablement component 160 is described as a single component, the skill-enablement component 160 may be more than one component. The skill-enablement component 160 may utilize the authorization codes, access tokens, user identifier, and/or skill identifier provided in the skill-enablement request to enable the skill in question. At step 7.3, the skill-enablement component may send data to the provisioning component 148 indicating that the skill in question has been enabled in association with the temporary account. At step 8.3, the provisioning component 148 may send the data indicating that he skill in questions has been enabled to the smart-device system 166. The data may include one or more access tokens and/or authorization codes to allow for the secure exchange of information associated with use of the skill with the smart-device system 166. At this point, the temporary account may be linked with the skill associated with the smart-device system 166.

Figure 5:
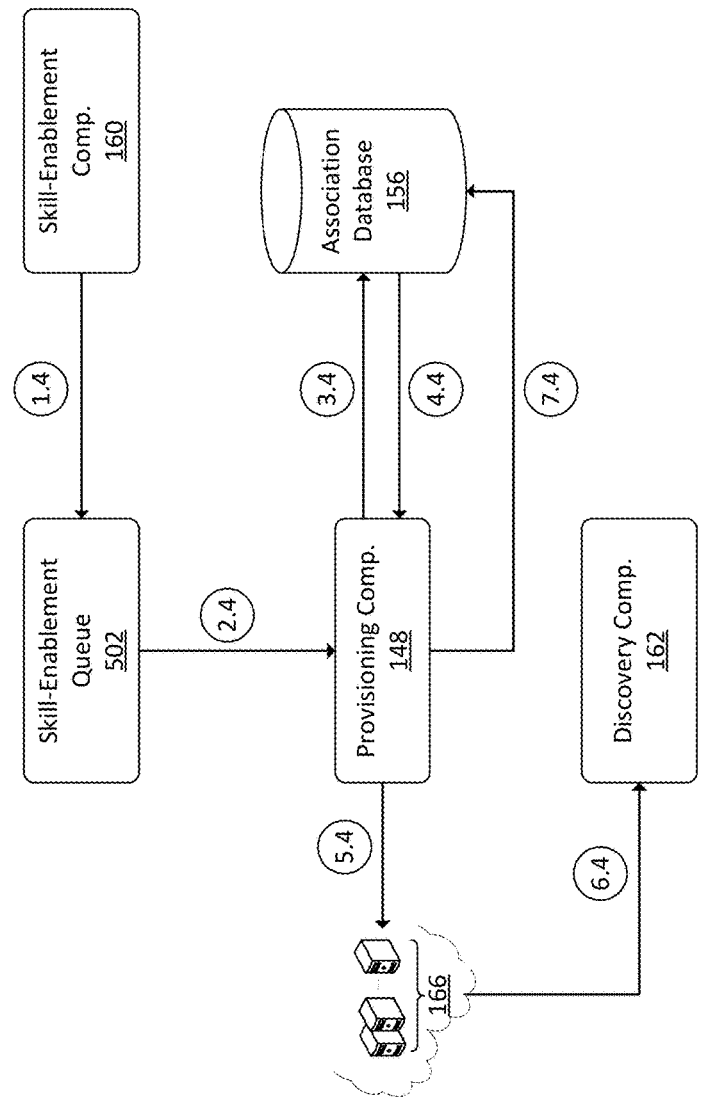
FIG. 5 illustrates a conceptual diagram of example components of a system for registering a smart device with a smart-home system.

FIG. 5 illustrates a conceptual diagram of example components of a system 500 for registering a smart device 104 with a smart-home system. The system 500 may include at least a portion of the system 100 described with respect to FIG. 1. For example, the system 500 may include a smart-device system 166 and components of a remote system 106, such as a provisioning component 148, an association database 156, a skill-enablement component 160, and/or a discovery component 162. The system 500 may also include a skill-enablement queue 502. The components are shown and described using steps 1.4-7.4, as illustrated in FIG. 5. It should be understood that while steps 1.4-7.4 are described in sequential order, some or all of the operations may be performed in an order other than that described herein and/or some or all of the operations may be performed in parallel. It should be understood that the processes described with respect to FIG. 5 may be based at least in part on one or more of the processes described with respect to FIG. 4. It should also be understood that the processes described with respect to step 1.4 of FIG. 5 may be performed in response to and/or based at least in part on the result of step 7.3 from FIG. 4.

At step 1.4, one or more processes for registering the smart device 104 with the smart-home system may be performed. For example, the skill-enablement component 160 may publish a skill-link event in the skill-enablement queue 502 of the remote system 106. The skill-link event may indicate that the skill in question has been linked to a temporary account generated by the smart-device system 166.

At step 2.4, the skill-enablement queue 502 may then send a skill event to the provisioning component 148, where the skill event may include the skill identifier and the temporary account identifier. At step 3.4, the provisioning component 148 may query the association database 156 to determine a status of the association session for the smart device 104 and the temporary account. At step 4.4, the association database 156 may return an indication that the temporary account has been associated with the skill and the user identifier data, but the temporary account has not yet been registered with the smart-home system of the remote system 106. The provisioning component 148 may then generate a device-association directive. The device-association directive may include first access tokens that may be utilized by the smart-device system 166 to identify the temporary account at issue. The device-association directive may also include the device identifier of the smart device 104 as maintained by the remote system 106.

At step 5.4, the provisioning component 148 may send the device-association directive to the smart-device system 166. The smart-device system 166, having received the device-association directive, may, at step 6.4, send a discovery request to the remote system 106, and specifically to the discovery component 162 of the remote system 106. The discovery request may include second access tokens that may be utilized by the discovery component 162 to identify account data associated with the voice-enabled device 102 to be utilized for receiving voice commands to perform operations in association with the smart device 104. The discovery request may also include indications of one or more capabilities of the smart device 104 and/or the identifier of the smart device 104 as maintained by the smart-device system 166. The discovery component 162 may utilize the discovery request to "discover" or otherwise identify the smart device 104 as a device to be associated with the voice-enabled device 102 and/or the user account associated with the voice-enabled device 102 to enable operation of the smart device 104 via the voice-enabled device 102.

At step 7.4, the provisioning component 148 may send data to the association database 156 indicating that the smart device in question has been registered to the smart-home system and/or that the device discovery process has been completed. The association database 156 may update the setup session to indicate that the session is no longer pending or is otherwise complete.

Figure 6:
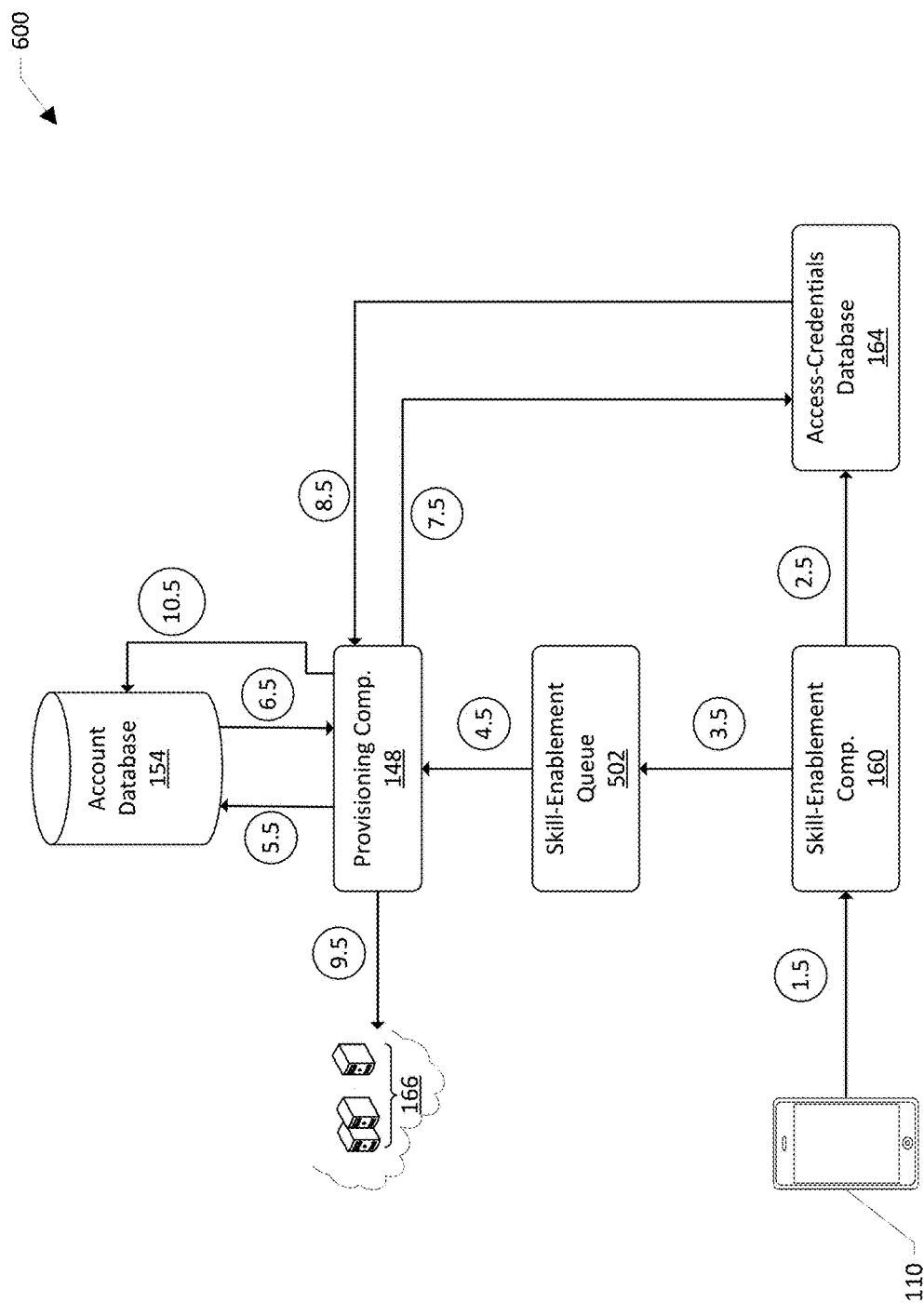
FIG. 6 illustrates a conceptual diagram of example components of a system for associating account data generated by the smart-device system in association with the user identifier data and account data established by a user of the smart device.

FIG. 6 illustrates a conceptual diagram of example components of a system 600 for associating account data generated by the smart-device system 166 in association with the user identifier data and account data established by a user of the smart device 104. The system 600 may include at least a portion of the system 100 described with respect to FIG. 1. For example, the system 600 may include a smart-device system 166 and components of a remote system 106, such as a provisioning component 148, an account database 154, a skill-enablement component 160, a skill-enablement queue 502, and/or an access-credentials database 164. The components are shown and described using steps 1.5-10.5, as illustrated in FIG. 6. It should be understood that while steps 1.5-10.5 are described in sequential order, some or all of the operations may be performed in an order other than that described herein and/or some or all of the operations may be performed in parallel.

The processes described herein above may result in the smart device 104 being operable by the voice-enabled device 102 and/or by an application 144 associated with the voice-enabled device 102, such as using the mobile device 110 associated with the user. However, the user may also desire to utilize the smart-device application 142 associated with the smart-device system 166, such as when additional and/or different functionality is provided by such an application 142. In these examples, the user may generate a user account to be associated with the smart device 104.

At step 1.5, the device utilized to generate the user account, and/or the smart-device system 166, may send a notification to the remote system 106 indicating that the user-generated account has been created. At step 2.5, The skill-enablement component 160 of the remote system 106 may receive the notification and may initiate a process of merging the temporary account and the user-generated account. For example, one or more access credentials and/or tokens may be updated in the access-credentials database 164 to reflect authorization to communicate with the smart-device system 166 in association with the user-generated account.

At step 3.5, the skill-enablement component 160 may publish a skill-link event to the skill-enablement queue 502 indicating that the user-generated account has been created and the user-generated account is to be merged with the temporary account. At step 4.5, the skill-enablement queue may send a skill event to the provisioning component 148, where the skill event may include the skill identifier for the skill in question and the account identifier.

At step 5.5, the provisioning component 148, having received the skill event from the skill-enablement queue, may query the account database 154 to determine a status of the temporary account and whether the temporary account has been merged with another account. In these examples, the temporary account may not yet have been merged and, at step 6.5, the account database 154 may return a status indicating that the temporary account has not yet been merged. At step 7.5, the provisioning component 148 may query the access-credentials database 164 for the access tokens, which may be retrieved based at least in part on the user identifier data and/or the skill identifier.

At step 8.5, the access-credentials database 164 may return the access tokens to the provisioning component 148. The provisioning component 148 may generate a merge directive indicating that the device identifiers associated with the temporary account should be associated with the user-generated account. The merge directive may also include information such as the access tokens and/or the user identifier data to assist in identifying the proper temporary account to be merged and/or to allow for the secure exchange of information in association with the user-generated account.

At step 9.5, the merge directive may be sent from the provisioning component 148 to the smart-device system 166. The merge directive may cause the smart-device system 166 to associate the device identifiers of smart devices associated with the temporary account with the user-generated account. In examples, the merge directive may also cause the smart-device system 166 to transfer ownership of a given account to user identifier data associated with the user-generated account. Also, by way of example, the merge directive may cause the smart-device system 166 to delete or otherwise remove the temporary account from its database(s) once the merge of account identifiers from the temporary account to the user-generated account is complete and/or once confirmation of the merge is received at the remote system.

At step 10.5, the provisioning component 148 may send data to the account database 154 indicating that the merge directive has been sent to the smart-device system 166 and/or that a merge status associated with the user identifier data and/or the temporary account has changed from pending to complete. The account database 154 may be updated to reflect the status change. It should be understood that while this operation is described as step 10.5, this process may be performed before, after, or at the same time as the operations described with respect to step 9.5.

While account data merging is described with respect to FIG. 6 as being performed in instances where the user-generated account is associated with the smart-device system, account data merging may also, or alternatively, be performed when the user-generated account is associate with the speech-processing system. For example, the account merging process may include receiving a request to enable an application associated with a smart device such that the smart device is controllable utilizing voice commands. For example, having received user identifier data from a speech-processing system, a smart-device system may generate account data to associate with the user device. This account may be described herein as a "shadow account" or "temporary account." The smart-device system may send a skill-enablement request to the speech-processing system. The skill-enablement request may include one or more authorization codes generated by an authorization-code generator, information associated with the skill at issue, the user identifier data, and/or one or more access tokens.

The application may then be enabled in association with first account data generated by a smart-device system without user input. For example, a provisioning component of the speech-processing system, having received the skill-enablement request from the smart-device system, may perform one or more security operations before sending a response to the skill-enablement request. For example, the provisioning component may query the user-identifier generator for an indication of whether the user identifier data provided with the skill-enablement request corresponds to user identifier data generated by the user-identifier generator in association with the skill at issue. The user-identifier generator may send a response to the provisioning component indicating that the user identifier data provided with the skill-enablement request corresponds to user identifier data generated by the user-identifier generator in association with the skill.

The provisioning component may query the account database to determine a status of account linking associated with the user identifier data. The account database may return data indicating that account data has not yet been linked to the user identifier data. The provisioning component may request skill enablement, such as by the skill-enablement component, of the speech-processing system. It should be understood that while the skill-enablement component is described as a single component, the skill-enablement component may be more than one component. The skill-enablement component may utilize the authorization codes, access tokens, user identifier, and/or skill identifier provided in the skill-enablement request to enable the skill in question. The skill-enablement component may send data to the smart-device system indicating that the skill in question has been enabled in association with the temporary account. The data may include one or more access tokens and/or authorization codes to allow for the secure exchange of information associated with use of the skill with the smart-device system. At this point, the temporary account may be linked with the skill associated with the smart-device system.

First data may then be received indicating that second account data has been generated in association with the smart device. For example, a user may generate an account to be utilized to operate the smart-home device. The account may be generated in association with the smart-home-device system and/or the account may be generated in association with the speech-processing system. To generate the account, the user may download or otherwise gain access to an application associated with the smart-home-device system and/or the speech-processing system and provide input, such as an account identifier, identifying information, network access information, and/or other information associated with use of smart-home devices.

The speech-processing system may then enable, based at least in part on receiving the first data, the application in association with the second account data such that information associated with the smart device is associated with first account identifier data of the second account data instead of second account identifier data of the first account data. For example, when the smart-home device is operated, such as via voice commands utilizing a voice-enabled device, data may be generated that represents such operations. This usage data may be associated with the user-generated account data instead of the first account data. Additionally, when a request to operate the device and/or perform an action in association with the device, the skill may be utilized to receive data and/or instructions to be utilized for operating the device. For example, the speech-processing system may receive a voice command to operate the device and may request information, via the skill, from the smart-device system to perform the operation. To enable the speech-processing system to communicate with the smart-device system for operation of the smart device, the speech-processing system may enable the skill in association with the user-generated account data instead of the first account data.

In examples, account data merging may also include storing, in a database of a speech-processing system, the first account data in association with device identifier data of the smart device. The speech-processing system may also determine, based at least in part on receiving the first data, that the database indicates the first account data is associated with the device identifier data and cause, based at least in part on the database indicating the first account data is associated with the device identifier data, the device identifier data to be associated with the second account data. The speech-processing system may also cause usage data indicating operation of the smart device to be associated with the second account data instead of the first account data.

In further examples, account data merging may include, based at least in part on receiving the first data, generating a second request to associate device identifier data from the first account data with the second account data and sending the second request to the smart-device system. The speech-processing system may also receive, from the smart-device system, second data indicating that the device identifier data from the first account data has been associated with the second account data.

Account data merging may also include storing, in a database of a speech-processing system, first access credential data associated with the first account data, the first access credential data configured for the speech-processing system to securely exchange the information with the smart-home-device system. The speech-processing system may then generate, based at least in part on enabling the application in association with the second account, second access credential data for the smart-device system to securely exchange the information with the speech-processing system. The speech-processing system may then send the second access credential data to the smart-device system and receive, from the smart-device system, third access credential data for the speech-processing system to securely exchange the information in association with the second account data.

Additionally, or alternatively, the account data merging may include determining, based at least in part on receiving the first data, that device identifier data of the smart device is associated with a status indicating that device identifier has yet to be associated with user-generated account data. In these examples, enabling the application in association with the second account may be based at least in part on the status.

Additionally, or alternatively, the account data merging may include storing, in association with the first account data, second data indicating usage history of the smart device via the voice commands. The speech-processing system may then cause, based at least in part on enabling the application in association with the second account data, the second data to be associated with the second account. The speech-processing system may additionally, or alternatively, store, in association with the second account data, second data indicating a user-defined operation preference for smart devices and associate the user-defined operation preference with the smart device based at least in part on enabling the application in association with the second account data.

In examples, the speech-processing system may receive second data indicating that a second smart device has initiated communication with the smart-device system and determine that the second smart device is associated with the second account data. The speech-processing system may then enable the application for use in association with the second smart device based at least in part on the second smart device being associated with the second account data.

Figure 7:
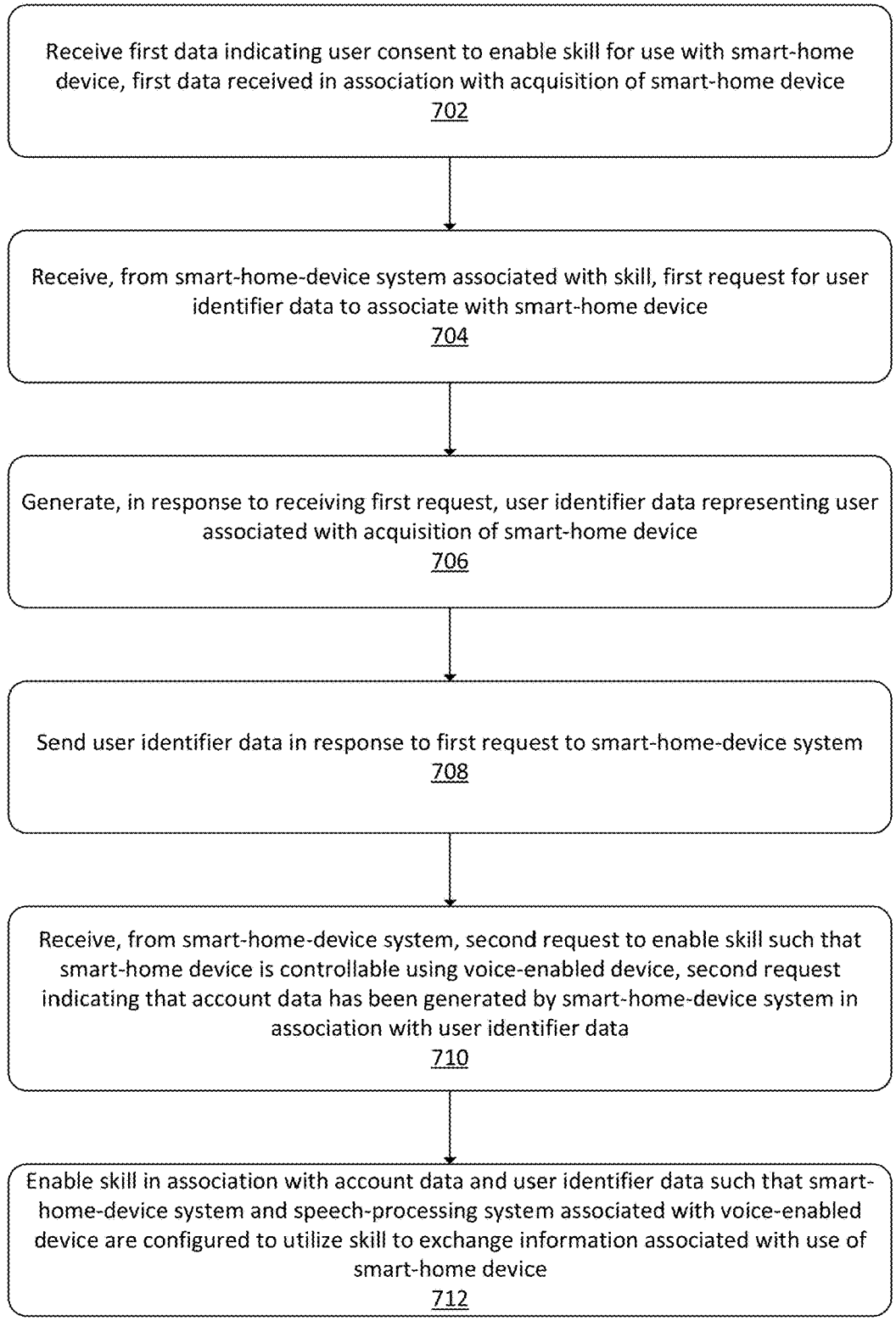
FIG. 7 illustrates a flow diagram of an example process for accountless device control.
Figure 8:
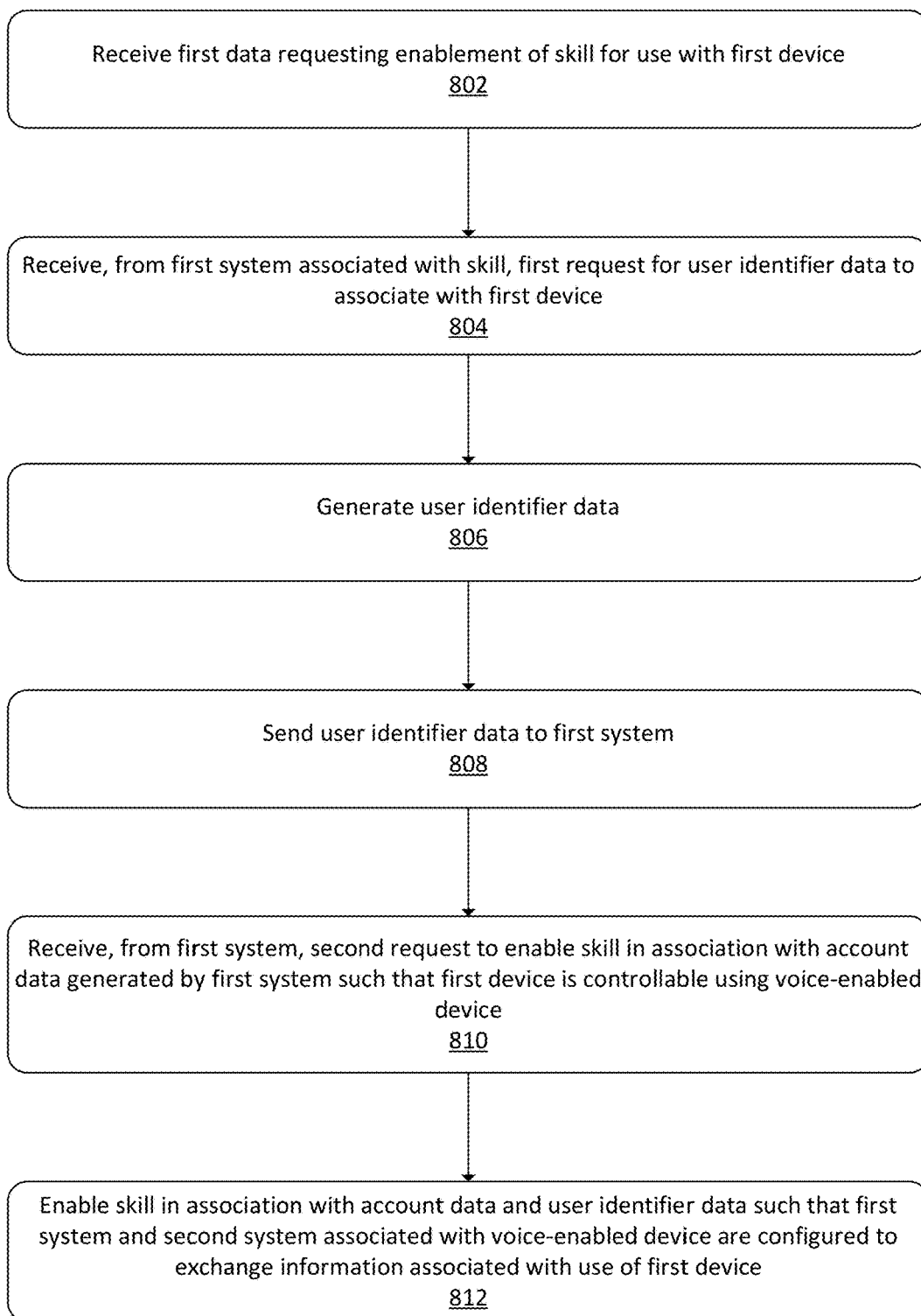
FIG. 8 illustrates a flow diagram of another example process for accountless device control.

FIGS. 7 and 8 illustrate processes for accountless device control. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-6 and 9-11, although the processes may be implemented in a wide variety of other environments, architectures and systems.

FIG. 7 illustrates a flow diagram of an example process 700 for accountless device control. The order in which the operations or steps are described is not intended to be construed as a limitation, and any number of the described operations may be combined in any order and/or in parallel to implement process 700.

At block 702, the process 700 may include receiving first data indicating user consent to enable a skill for use with a smart-home device, the first data received in association with acquisition of the smart-home device. For example, data indicating the user consent may be sent to and stored in an order system. The order system may also store information associated with the acquisition of the smart device, such as the account data utilized during the acquisition, the smart device that was acquired, and/or other information associated with the acquisition. The smart device may be shipped to an address provided during the acquisition process. As part of the shipping process, in examples, the package associated with the smart device may be scanned by one or more scanners as part of the normal delivery process. A shipment notification may be generated and may include an order identifier associated with the acquisition of the smart device, an account identifier associated with the account data utilized to acquire the smart device, and/or a public key or other access credential associated with the smart device that was acquired and/or with the smart-device system. The order system may utilize this information along with the indication of consent to set up the smart device to generate pre-registration data associated with the smart device. The pre-registration data may include indications of the account identifier, the user consent, the smart-device system associated with the smart device, the public key, etc. Thereafter, the smart device may be delivered to the address indicated during acquisition. The user, having received the smart device, may plug in the smart device or otherwise provide power to the smart device, such as utilizing batteries, for example.

The smart device may be configured to initiate communication with one or more network access points associated with the environment in which the smart device is disposed. Based at least in part on the user consent described above and/or additional or different user consent, such as consent provided during setup of a voice-enabled device, the setup component of a remote system may be utilized to provide network access credentials to the smart device and/or one or more tokens to allow for the secure exchange of information between the remote system and the smart device and/or between the smart device and the voice-enabled device. The smart device may utilize the network access credentials to gain Internet access. The smart device, having access to the Internet, may send data to the smart-device system indicating that the smart device has come online and is ready to be setup and/or utilized.

At block 704, the process 700 may include receiving, from a smart-home-device system associated with the skill, a first request for user identifier data to associate with the smart-home device. For example, the smart-device system may send a skill-device association request to the remote system requesting user identifier data to associate with the smart device. A provisioning component of the remote system may receive the request from the smart-device system and may send a request to the skill-enablement database for an indication of whether a skill has been enabled in association with the user account. For example, a skill associated with the smart-device system may have already been enabled in association with user identifier data corresponding to the user and/or to the account data associated with the user. The user, for example, may have previously acquired and/or setup a smart device that utilizes the skill associated with the smart-device system. In examples where the skill has already been enabled, the provisioning component may respond to the smart-device system with an indication of the user account and/or access tokens to allow for the secure exchange of information between the smart-device system and the remote system with respect to the smart device. However, in other examples, the provisioning component may receive an indication from the skill-enablement database that the skill has not been enabled in association with a user account.

In these examples, the provisioning component may request information from the setup component to ensure that the setup component is or has recently performed operations associated with providing network access credentials to the smart device and/or providing one or more security tokens to the smart device. The setup component may return data to the provisioning component indicating that setup of the smart device has been and/or is being performed, along with the requested information described above. The provisioning component may query the order system to determine whether the user consent described above has been provided to proceed with setup of the smart device. The order system may send data indicating that the user consent has been given to proceed with setup of the smart device.

At block 706, the process 700 may include generating, in response to receiving the first request, the user identifier data representing a user associated with the acquisition of the smart-home device. For example, having determined that the user consent has been provided, the provisioning component may initiate the process of generating user identifier data to provide to the smart-device system. For example, the provisioning component may send, to the association database, data indicating an association session is pending and information associated with the association session. The information may include the account identifier utilized for purchasing the smart device, an identifier of the skill associated with the smart-device system, and a status of the association session, for example.

The provisioning component may send a request to a user-identifier generator to generate user identifier data for sending to the smart-device system. The user identifier data may be unique to the account data utilized for acquisition of the smart device and the skill associated with the smart-device system. The user-identifier generator may return the user identifier data to the provisioning component. The provisioning component may save information associated with the user identifier data in the account database. The information may include the account identifier for the account data utilized to acquire the smart device, the user identifier data generated by the user-identifier generator, the skill identifier, a status of linking the user identifier data to account data provided by the smart-device system, and/or a status of whether the account data provided by the smart-device system has been merged with a user-created account associated with the smart-device system.

At block 708, the process 700 may include sending the user identifier data in response to the first request to the smart-home-device system. For example, the provisioning component may send a response, which may include the user identifier data, to the skill-device association event to the smart-device system.

At block 710, the process 700 may include receiving, from the smart-home-device system, a second request to enable the skill such that the smart-home device is controllable using a voice-enabled device, the second request indicating that account data has been generated by the smart-home-device system in association with the user identifier data. For example, having received the response, the smart-device system may generate account data to associate with the user device. This account may be described herein as a "shadow account" or "temporary account." The smart-device system may send a skill-enablement request to the remote system. The skill-enablement request may include one or more authorization codes generated by an authorization-code generator, information associated with the skill at issue, the user identifier data, and/or one or more access tokens.

At block 712, the process 700 may include enabling the skill in association with the account data and the user identifier data such that the smart-home-device system and a speech-processing system associated with the voice-enabled device are configured to utilize the skill to exchange information associated with use of the smart-home device. For example, the provisioning component, having received the skill-enablement request from the smart-device system, may perform one or more security operations before sending a response to the skill-enablement request. For example, the provisioning component may query the user-identifier generator for an indication of whether the user identifier data provided with the skill-enablement request corresponds to user identifier data generated by the user-identifier generator in association with the skill at issue. The user-identifier generator may send a response to the provisioning component indicating that the user identifier data provided with the skill-enablement request corresponds to user identifier data generated by the user-identifier generator in association with the skill.

The provisioning component may query the account database to determine a status of account linking associated with the user identifier data. The account database may return data indicating that account data has not yet been linked to the user identifier data. The provisioning component may request skill enablement, such as by the skill-enablement component, of the remote system. It should be understood that while the skill-enablement component is described as a single component, the skill-enablement component may be more than one component. The skill-enablement component may utilize the authorization codes, access tokens, user identifier, and/or skill identifier provided in the skill-enablement request to enable the skill in question. The skill-enablement component may send data to the smart-device system indicating that the skill in question has been enabled in association with the temporary account. The data may include one or more access tokens and/or authorization codes to allow for the secure exchange of information associated with use of the skill with the smart-device system. At this point, the temporary account may be linked with the skill associated with the smart-device system.

Additionally, or alternatively, the process 700 may include determining second account data of the speech-processing system that is associated with the user identifier data. In these examples, he user identifier data may include an anonymously-generated identifier associated with an identifier of the skill such that the user identifier data represents a unique association between the first account data and the skill. The process 700 may also include associating the first account data with the second account data in response to determining that the second account data is associated with the user identifier data.

Additionally, or alternatively, the process 700 may include receiving an indication that second account data associated with the smart-device system has been created for use of the smart device. The process 700 may also include sending, to the smart-device system and in response to receiving the indication, a directive to associate the device identifier of the smart device with the second account instead of the first account. The process 700 may also include causing access credentials to be exchanged with the smart-device system, the access credentials enabling information associated with the smart device to be exchanged in association with the second account.

Additionally, or alternatively, the process 700 may include storing, in a database and in response to generating the user identifier data, first data indicating that the user identifier data is pending association with the skill. The process 700 may also include in response to receiving the second request to enable the skill, identifying the first data from the database. The process 700 may also include in response to receiving the second request to enable the skill, determining that the user identifier data has been sent to the smart-home-device system. In these examples, enabling the skill may be in response to identifying the first data from the database and determining that the user identifier data has been sent to the smart-home-device system.

Additionally, or alternatively, the process 700 may include receiving, from the smart-home-device system, access credentials associated with the first account data. The process 700 may also include determining, from the access credentials, second account data associated with the user identifier data, the second account data indicating that the voice-enabled device is associated with the second account data. The process 700 may also include associating the smart-home device with the second account data such that voice control of the smart-home device utilizing the voice-enabled device is enabled.

FIG. 8 illustrates a flow diagram of another example process 800 for accountless device control. The order in which the operations or steps are described is not intended to be construed as a limitation, and any number of the described operations may be combined in any order and/or in parallel to implement process 800.

At block 802, the process 800 may include receiving first data requesting enablement of a skill for use with a first device. For example, data indicating the user consent may be sent to and stored in an order system. The order system may also store information associated with the acquisition of the smart device, such as the account data utilized during the acquisition, the smart device that was acquired, and/or other information associated with the acquisition. The smart device may be shipped to an address provided during the acquisition process. As part of the shipping process, in examples, the package associated with the smart device may be scanned by one or more scanners as part of the normal delivery process. A shipment notification may be generated and may include an order identifier associated with the acquisition of the smart device, an account identifier associated with the account data utilized to acquire the smart device, and/or a public key or other access credential associated with the smart device that was acquired and/or with the smart-device system. The order system may utilize this information along with the indication of consent to set up the smart device to generate pre-registration data associated with the smart device. The pre-registration data may include indications of the account identifier, the user consent, the smart-device system associated with the smart device, the public key, etc. Thereafter, the smart device may be delivered to the address indicated during acquisition. The user, having received the smart device, may plug in the smart device or otherwise provide power to the smart device, such as utilizing batteries, for example.

The smart device may be configured to initiate communication with one or more network access points associated with the environment in which the smart device is disposed. Based at least in part on the user consent described above and/or additional or different user consent, such as consent provided during setup of a voice-enabled device, the setup component of a remote system may be utilized to provide network access credentials to the smart device and/or one or more tokens to allow for the secure exchange of information between the remote system and the smart device and/or between the smart device and the voice-enabled device. The smart device may utilize the network access credentials to gain Internet access. The smart device, having access to the Internet, may send data to the smart-device system indicating that the smart device has come online and is ready to be setup and/or utilized.

At block 804, the process 800 may include receiving, from a first system associated with the skill, a first request for user identifier data to associate with the first device. For example, the smart-device system may send a skill-device association request to the remote system requesting user identifier data to associate with the smart device. A provisioning component of the remote system may receive the request from the smart-device system and may send a request to the skill-enablement database for an indication of whether a skill has been enabled in association with the user account. For example, a skill associated with the smart-device system may have already been enabled in association with user identifier data corresponding to the user and/or to the account data associated with the user. The user, for example, may have previously acquired and/or setup a smart device that utilizes the skill associated with the smart-device system. In examples where the skill has already been enabled, the provisioning component may respond to the smart-device system with an indication of the user account and/or access tokens to allow for the secure exchange of information between the smart-device system and the remote system with respect to the smart device. However, in other examples, the provisioning component may receive an indication from the skill-enablement database that the skill has not been enabled in association with a user account.

In these examples, the provisioning component may request information from the setup component to ensure that the setup component is or has recently performed operations associated with providing network access credentials to the smart device and/or providing one or more security tokens to the smart device. The setup component may return data to the provisioning component indicating that setup of the smart device has been and/or is being performed, along with the requested information described above. The provisioning component may query the order system to determine whether the user consent described above has been provided to proceed with setup of the smart device. The order system may send data indicating that the user consent has been given to proceed with setup of the smart device.

At block 806, the process 800 may include generating the user identifier data. For example, having determined that the user consent has been provided, the provisioning component may initiate the process of generating user identifier data to provide to the smart-device system. For example, the provisioning component may send, to the association database, data indicating an association session is pending and information associated with the association session. The information may include the account identifier utilized for purchasing the smart device, an identifier of the skill associated with the smart-device system, and a status of the association session, for example.

The provisioning component may send a request to a user-identifier generator to generate user identifier data for sending to the smart-device system. The user identifier data may be unique to the account data utilized for acquisition of the smart device and the skill associated with the smart-device system. The user-identifier generator may return the user identifier data to the provisioning component. The provisioning component may save information associated with the user identifier data in the account database. The information may include the account identifier for the account data utilized to acquire the smart device, the user identifier data generated by the user-identifier generator, the skill identifier, a status of linking the user identifier data to account data provided by the smart-device system, and/or a status of whether the account data provided by the smart-device system has been merged with a user-created account associated with the smart-device system.

At block 808, the process 800 may include sending the user identifier data to the first system. For example, the provisioning component may send a response, which may include the user identifier data, to the skill-device association event to the smart-device system.

At block 810, the process 800 may include receiving, from the first system, a second request to enable the skill in association with account data generated by the first system such that the first device is controllable using a voice-enabled device. For example, having received the response, the smart-device system may generate account data to associate with the user device. This account may be described herein as a "shadow account" or "temporary account." The smart-device system may send a skill-enablement request to the remote system. The skill-enablement request may include one or more authorization codes generated by an authorization-code generator, information associated with the skill at issue, the user identifier data, and/or one or more access tokens.

At block 812, the process 800 may include enabling the skill in association with the account data and the user identifier data such that the first system and a second system associated with the voice-enabled device are configured to exchange information associated with use of the first device. For example, the provisioning component, having received the skill-enablement request from the smart-device system, may perform one or more security operations before sending a response to the skill-enablement request. For example, the provisioning component may query the user-identifier generator for an indication of whether the user identifier data provided with the skill-enablement request corresponds to user identifier data generated by the user-identifier generator in association with the skill at issue. The user-identifier generator may send a response to the provisioning component indicating that the user identifier data provided with the skill-enablement request corresponds to user identifier data generated by the user-identifier generator in association with the skill.

Additionally, or alternatively, the process 800 may include receiving an indication that second account data associated with the system has been created. The process 800 may also include sending, to the system and based at least in part on the indication, a request to associate the device identifier data with the second account data. The process 800 may also include causing access credential data to be exchanged with the system, the access credential data enabling information associated with the smart device to be exchanged in association with the second account.

Additionally, or alternatively, the process 800 may include determining second account data of the speech-processing system that is associated with the user identifier data. In these examples, he user identifier data may include an anonymously-generated identifier associated with an identifier of the skill such that the user identifier data represents a unique association between the first account data and the skill. The process 800 may also include associating the first account data with the second account data in response to determining that the second account data is associated with the user identifier data.

Additionally, or alternatively, the process 800 may include storing, in a database and based at least in part on generating the user identifier data, second data indicating that the user identifier data is pending association with the skill. The process 800 may also include based at least in part on receiving the second request to enable the skill: identifying the second data from the database; and determining that the user identifier data has been sent to the first system. In these examples, enabling the skill may be based at least in part on identifying the second data from the database and determining that the user identifier data has been sent to the first system.

Additionally, or alternatively, the process 800 may include receiving, from the first system, access credential data associated with the first account data. The process 800 may also include determining, based at least in part on the access credential data, second account data associated with the user identifier data, the second account data indicating that the voice-enabled device is associated with the second account data. The process 800 may also include associating the smart device with the second account data such that voice control of the smart device utilizing the voice-enabled device is enabled.

Additionally, or alternatively, the process 800 may include receiving second data indicating that consent was provided in association with acquisition of the smart device. The process 800 may also include receiving, from at least one of the smart device or the first system, third data indication that the smart device has been enabled for wireless communication. The process 800 may also include determining that enablement of the skill for use with the smart device is authorized based at least in part on: the second data; and the third data. In these examples, generating the user identifier data may be based at least in part on determining that enablement of the skill is authorized.

Additionally, or alternatively, the process 800 may include determining, based at least in part on receiving the first request, that the skill has yet to be associated with one or more user identifiers. In these examples, generating the user identifier data may be based at least in part on determining that the skill has yet to be associated with the one or more user identifiers.

Additionally, or alternatively, the process 800 may include receiving, from the voice-enabled device, audio data representing a user utterance to operate the smart device. The process 800 may also include determining, based at least in part on the device identifier data, that the smart device is associated with the first account data. The process 800 may also include sending a third request to the voice-enabled device to operate the smart device and sending second data indicating that the smart device has been operated by the first system, the second data associating operation of the smart device with the first account data.

Additionally, or alternatively, the process 800 may include identifying second account data associated with the user identifier data, the second account data indicating device identifier data of the voice-enabled device. The process 800 may also include associating the skill with the second account data based at least in part on the user identifier data.

Figure 9:
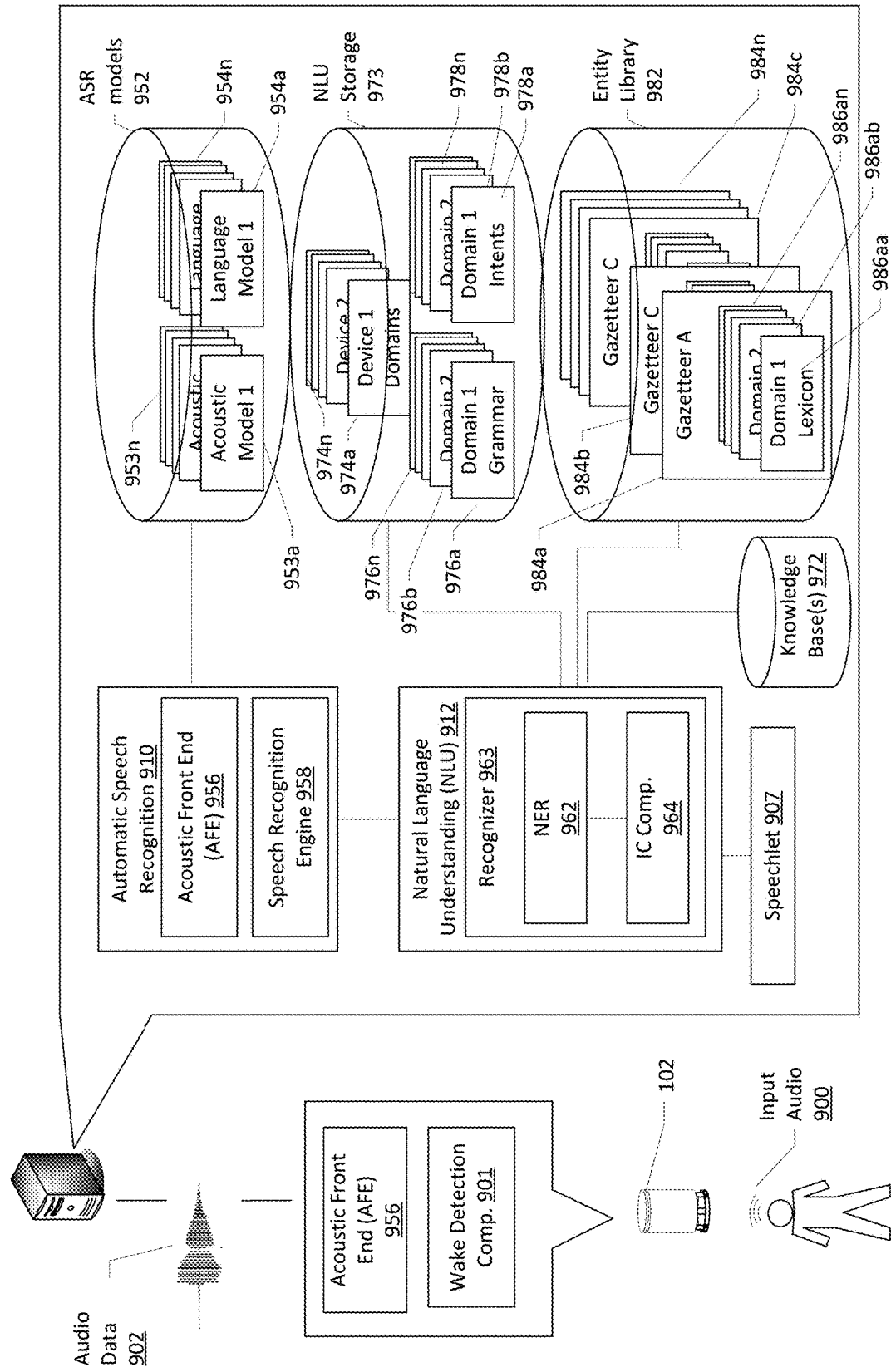
FIG. 9 illustrates a conceptual diagram of components of a speech-processing system for processing audio data provided by one or more devices.

FIG. 9 illustrates a conceptual diagram of how a spoken utterance can be processed, allowing a system to capture and execute commands spoken by a user, such as spoken commands that may follow a wakeword, or trigger expression, (i.e., a predefined word or phrase for "waking" a device, causing the device to begin sending audio data to a remote system, such as system 106). The various components illustrated may be located on a same device or different physical devices. Message between various components illustrated in FIG. 9 may occur directly or across a network 108. An audio capture component, such as a microphone 118 of the device 102, or another device, captures audio 900 corresponding to a spoken utterance. The device 102, using a wake-word component 901, then processes audio data corresponding to the audio 900 to determine if a keyword (such as a wakeword) is detected in the audio data. Following detection of a wakeword, the device 102 sends audio data 902 corresponding to the utterance to the remote system 106 that includes an ASR component 910. The audio data 902 may be output from an optional acoustic front end (AFE) 956 located on the device prior to transmission. In other instances, the audio data 902 may be in a different form for processing by a remote AFE 956, such as the AFE 956 located with the ASR component 910 of the remote system 106.

The wake-word component 901 works in conjunction with other components of the user device, for example a microphone to detect keywords in audio 900. For example, the device may convert audio 900 into audio data, and process the audio data with the wake-word component 901 to determine whether human sound is detected, and if so, if the audio data comprising human sound matches an audio fingerprint and/or model corresponding to a particular keyword.

The user device may use various techniques to determine whether audio data includes human sound. Some embodiments may apply voice activity detection (VAD) techniques. Such techniques may determine whether human sound is present in an audio input based on various quantitative aspects of the audio input, such as the spectral slope between one or more frames of the audio input: the energy levels of the audio input in one or more spectral bands: the signal-to-noise ratios of the audio input in one or more spectral bands; or other quantitative aspects. In other embodiments, the user device may implement a limited classifier configured to distinguish human sound from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in human sound storage, which acoustic models may include models corresponding to human sound, noise (such as environmental noise or background noise), or silence. Still other techniques may be used to determine whether human sound is present in the audio input.

Once human sound is detected in the audio received by user device (or separately from human sound detection), the user device may use the wake-word component 901 to perform wakeword detection to determine when a user intends to speak a command to the user device. This process may also be referred to as keyword detection, with the wakeword being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio fingerprints, or other data to determine if the incoming audio "matches" stored audio data corresponding to a keyword.

Thus, the wake-word component 901 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment, the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 102 may "wake" and begin transmitting audio data 902 corresponding to input audio 900 to the remote system 106 for speech processing. Audio data corresponding to that audio may be sent to remote system 106 for routing to a recipient device or may be sent to the remote system 106 for speech processing for interpretation of the included speech (either for purposes of enabling voice-messages and/or for purposes of executing a command in the speech). The audio data 902 may include data corresponding to the wakeword, or the portion of the audio data corresponding to the wakeword may be removed by the local device 102 prior to sending. Further, a local device may "wake" upon detection of speech/spoken audio above a threshold, as described herein. Upon receipt by the remote system 106, an ASR component 910 may convert the audio data 902 into text. The ASR transcribes audio data into text data representing the words of the speech contained in the audio data 902. The text data may then be used by other components for various purposes, such as executing system commands, inputting data, etc. A spoken utterance in the audio data is input to a processor configured to perform ASR which then interprets the utterance based on the similarity between the utterance and pre-established language models 954 stored in an ASR model knowledge base (ASR Models Storage 952). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 953 stored in an ASR Models Storage 952), and the likelihood that a particular word that matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR process 910 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 956 and a speech recognition engine 958. The acoustic front end (AFE) 956 transforms the audio data from the microphone into data for processing by the speech recognition engine 958. The speech recognition engine 958 compares the speech recognition data with acoustic models 953, language models 954, and other data models and information for recognizing the speech conveyed in the audio data. The AFE 956 may reduce noise in the audio data and divide the digitized audio data into frames representing time intervals for which the AFE 956 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 958 may process the output from the AFE 956 with reference to information stored in speech/model storage (952). Alternatively, post front-end processed data (such as feature vectors) may be received by the device executing ASR processing from another source besides the internal AFE. For example, the user device may process audio data into feature vectors (for example using an on-device AFE 956) and transmit that information to a server across a network for ASR processing. Feature vectors may arrive at the remote system 106 encoded, in which case they may be decoded prior to processing by the processor executing the speech recognition engine 958.

The speech recognition engine 958 attempts to match received feature vectors to language phonemes and words as known in the stored acoustic models 953 and language models 954. The speech recognition engine 958 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc. By way of example, a user utterance may be "Alexa, turn on Bedroom Light?" The wake detection component may identify the wake word, otherwise described as a trigger expression, "Alexa," in the user utterance and may "wake" based on identifying the wake word. Audio data corresponding to the user utterance may be sent to the remote system 106, where the speech recognition engine 958 may identify, determine, and/or generate text data corresponding to the user utterance, here "turn on Bedroom Light."

The speech recognition engine 958 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 958 to other processing components, which may be local to the device performing ASR and/or distributed across the network(s). For example, ASR results in the form of a single textual representation of the speech, an N-best list including multiple hypotheses and respective scores, lattice, etc. may be sent to the remote system 106, for natural language understanding (NLU) processing, such as conversion of the text into commands for execution, either by the user device, by the remote system 106, or by another device (such as a server running a specific application like a search engine, etc.).

The device performing NLU processing 912 (e.g., server 106) may include various components, including potentially dedicated processor(s), memory, storage, etc. As shown in FIG. 9, an NLU component 912 may include a recognizer 963 that includes a named entity recognition (NER) component 962 which is used to identify portions of query text that correspond to a named entity that may be recognizable by the system. A downstream process called named entity resolution links a text portion to a specific entity known to the system. To perform named entity resolution, the system may utilize gazetteer information (984a-984n) stored in entity library storage 982. The gazetteer information may be used for entity resolution, for example matching ASR results with different entities (such as voice-enabled devices, smart devices, etc.) Gazetteers may be linked to users (for example a particular gazetteer may be associated with a specific user's device associations), may be linked to certain domains (such as music, shopping, etc.), or may be organized in a variety of other ways.

Generally, the NLU process takes textual input (such as processed from ASR 910 based on the utterance input audio 900) and attempts to make a semantic interpretation of the text. That is, the NLU process determines the meaning behind the text based on the individual words and then implements that meaning. NLU processing 912 interprets a text string to derive an intent or a desired action from the user as well as the pertinent pieces of information in the text that allow a device (e.g., device 102) to complete that action. For example, if a spoken utterance is processed using ASR 910 and outputs the text "turn on Bedroom Light" the NLU process may determine that the user intended to enable or otherwise turn on a smart-home device with the naming designator of "Bedroom Light."

The NLU may process several textual inputs related to the same utterance. For example, if the ASR 910 outputs N text segments (as part of an N-best list), the NLU may process all N outputs to obtain NLU results.

As will be discussed further below, the NLU process may be configured to parse and tag to annotate text as part of NLU processing. For example, for the text "turn on Bedroom Light." "turn on" may be tagged as a command (to display content) and "Bedroom Light" may be tagged as the naming identifier of the content to be displayed.

To correctly perform NLU processing of speech input, an NLU process 912 may be configured to determine a "domain" of the utterance so as to determine and narrow down which services offered by the endpoint device (e.g., remote system 106 or the user device) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) component 962 receives a query in the form of ASR results and attempts to identify relevant grammars and lexical information that may be used to construe meaning. To do so, the NLU component 912 may begin by identifying potential domains that may relate to the received query. The NLU storage 973 includes a database of devices (974a-974n) identifying domains associated with specific devices. For example, the user device may be associated with domains for music, telephony, calendaring, contact lists, and device-specific messages, but not video. In addition, the entity library may include database entries about specific services on a specific device, either indexed by Device ID, User ID, or Household ID, or some other indicator.

In NLU processing, a domain may represent a discrete set of activities having a common theme, such as "banking," health care," "smart home," "communications," "shopping," "music," "calendaring," etc. As such, each domain may be associated with a particular recognizer 963, language model and/or grammar database (976a-976n), a particular set of intents/actions (978a-978n), and a particular personalized lexicon (986). Each gazetteer (984a-984n) may include domain-indexed lexical information associated with a particular user and/or device. For example, the Gazetteer A (984a) includes domain-index lexical information 986aa to 986an. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both messages and, for example, music, the query may, substantially in parallel, be NLU processed using the grammar models and lexical information for messages, and will be processed using the grammar models and lexical information for music. The responses based on the query produced by each set of models is scored, with the overall highest ranked result from all applied domains ordinarily selected to be the correct result.

An intent classification (IC) component 964 parses the query to determine an intent or intents for each identified domain, where the intent corresponds to the action to be performed that is responsive to the query. Each domain is associated with a database (978a-978n) of words linked to intents. For example, A/V intent database may link words and phrases such as "turn on," "activate," and/or "enable," to a "turn on" intent. By way of further example, a timer intent database may link words and phrases such as "set," "start." "initiate," and "enable" to a "set timer" intent. A voice-message intent database, meanwhile, may link words and phrases such as "send a message," "send a voice message," "send the following," or the like. The IC component 964 identifies potential intents for each identified domain by comparing words in the query to the words and phrases in the intents database 978. In some instances, the determination of an intent by the IC component 964 is performed using a set of rules or templates that are processed against the incoming text to identify a matching intent.

In order to generate a particular interpreted response, the NER 962 applies the grammar models and lexical information associated with the respective domain to actually recognize a mention of one or more entities in the text of the query. In this manner, the NER 962 identifies "slots" or values (i.e., particular words in query text) that may be needed for later command processing. Depending on the complexity of the NER 962, it may also label each slot with a type of varying levels of specificity (such as noun, place, device name, device location, city, artist name, song name, amount of time, timer number, or the like). Each grammar model 976 includes the names of entities (i.e., nouns) commonly found in speech about the particular domain (i.e., generic terms), whereas the lexical information 986 from the gazetteer 984 is personalized to the user(s) and/or the device. For instance, a grammar model associated with the shopping domain may include a database of words commonly used when people discuss shopping.

The intents identified by the IC component 964 are linked to domain-specific grammar frameworks (included in 976) with "slots" or "fields" to be filled with values. Each slot/field corresponds to a portion of the query text that the system believes corresponds to an entity. To make resolution more flexible, these frameworks would ordinarily not be structured as sentences, but rather based on associating slots with grammatical tags. For example, if "turn on" is an identified intent, a grammar (976) framework or frameworks may correspond to sentence structures such as "cause device with {Bedroom Light} identifier to turn on."

For example, the NER component 962 may parse the query to identify words as subject, object, verb, preposition, etc., based on grammar rules and/or models, prior to recognizing named entities. The identified verb may be used by the IC component 964 to identify intent, which is then used by the NER component 962 to identify frameworks. A framework for the intent of "play a song." meanwhile, may specify a list of slots/fields applicable to play the identified "song" and any object modifier (e.g., specifying a music collection from which the song should be accessed) and the like. The NER component 962 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER component 962 may search the database of generic words associated with the domain (in the knowledge base 972). So, for instance, if the query was "identify this song," after failing to determine which song is currently being output, the NER component 962 may search the domain vocabulary for songs that have been requested lately. In the alternative, generic words may be checked before the gazetteer information, or both may be tried, potentially producing two different results.

The output data from the NLU processing (which may include tagged text, commands, etc.) may then be sent to an speechlet 907. The destination speechlet 907 may be determined based on the NLU output. For example, if the NLU output includes a command to send a message, the destination speechlet 907 may be a message sending application, such as one located on the user device or in a message sending appliance, configured to execute a message sending command. If the NLU output includes a search request, the destination speechlet 907 may include a search engine processor, such as one located on a search server, configured to execute a search command. After the appropriate command is generated based on the intent of the user, the speechlet 907 may provide some or all of this information to a text-to-speech (TTS) engine. The TTS engine may then generate an actual audio file for outputting the audio data determined by the speechlet 907 (e.g., "okay," or "Bedroom Light on"). After generating the file (or "audio data"), the TTS engine may provide this data back to the remote system 106.

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 912 during runtime operations where NLU operations are performed on text (such as text output from an ASR component 910). Each domain may have specially configured components to perform various steps of the NLU operations.

For example, in a NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 963. Each recognizer may include various NLU components such as an NER component 962, IC component 964 and other components such as an entity resolver, or other components.

For example, a messaging domain recognizer 963-A (Domain A) may have an NER component 962-A that identifies what slots (i.e., portions of input text) may correspond to particular words relevant to that domain. The words may correspond to entities such as (for the messaging domain) a recipient. An NER component 962 may use a machine learning model, such as a domain specific conditional random field (CRF) to both identify the portions corresponding to an entity as well as identify what type of entity corresponds to the text portion. The messaging domain recognizer 963-A may also have its own intent classification (IC) component 964-A that determines the intent of the text assuming that the text is within the proscribed domain. An IC component may use a model, such as a domain specific maximum entropy classifier to identify the intent of the text, where the intent is the action the user desires the system to perform. For this purpose, the remote system computing device 106 may include a model training component. The model training component may be used to train the classifier(s)/machine learning models discussed above.

As noted above, multiple devices may be employed in a single speech-processing system. In such a multi-device system, each of the devices may include different components for performing different aspects of the speech processing. The multiple devices may include overlapping components. The components of the user device and the remote system 106, as illustrated herein are exemplary, and may be located in a stand-alone device or may be included, in whole or in part, as a component of a larger device or system, may be distributed across a network or multiple devices connected by a network, etc.

Figure 10:
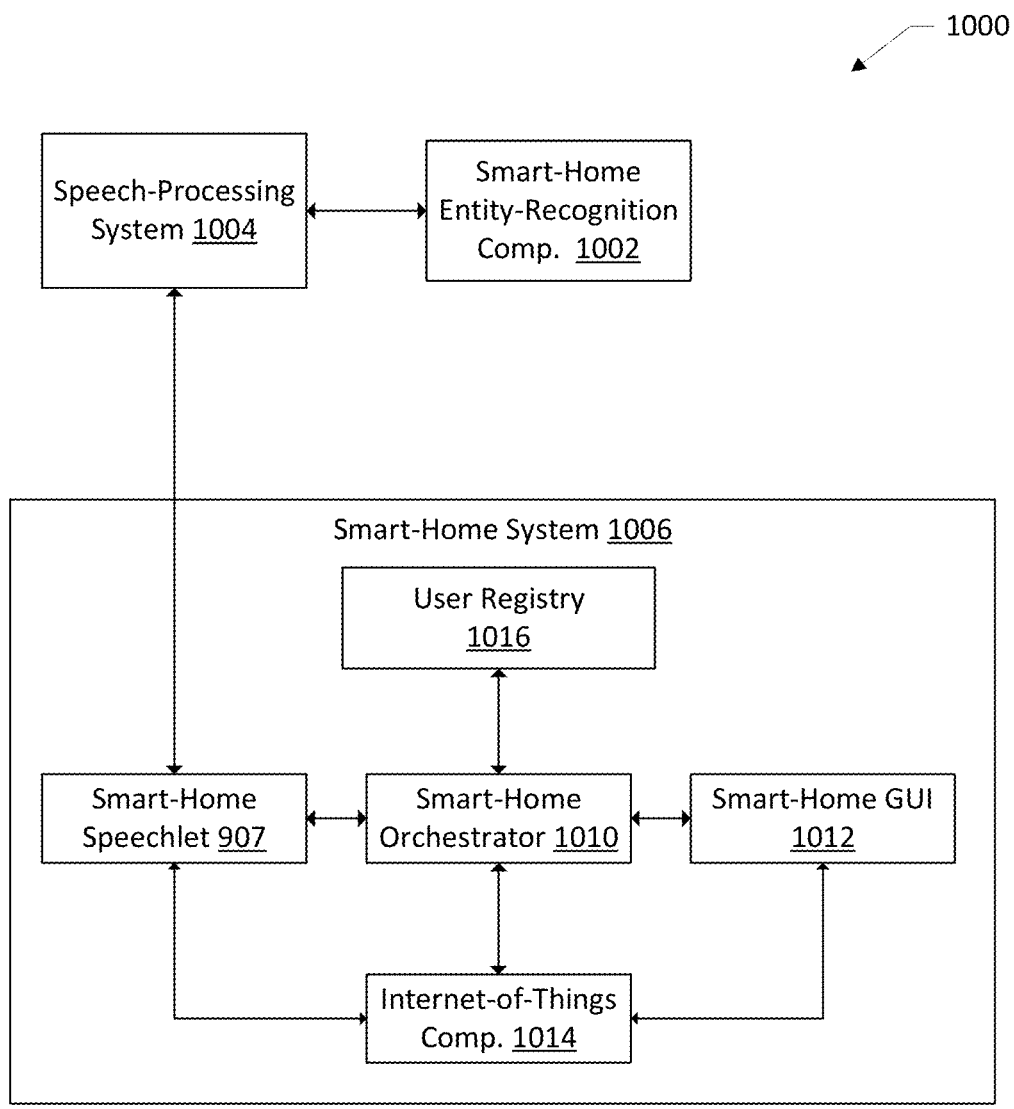
FIG. 10 illustrates a conceptual diagram of example components of a smart-home system.

FIG. 10 illustrates a conceptual diagram of example components of a smart-home system. The smart-home system 1006 may include components described above with respect to FIG. 1, such as a smart-home speechlet 907, for example. The smart-home system 1006 may also be configured to send data to and receive data from other components of a system and/or one or more other systems. For example, the other components may include a speech-processing system 1004. The smart-home system 1006 may also include components such as a smart-home orchestrator 1010, a smart-home graphical user interface (GUI) 1012, and/or an internet-of-things component 1014. Each of these components will be described in detail below:

As described herein, a user may interact with a smart device using tactile input to the smart device, voice input to a voice-enabled device, and/or input to an application residing on and/or accessible to a personal device. When a user interacts with a smart device using voice input to a voice-enabled device, audio data representing user utterances may be received at the speech-processing system 1004. The speech-processing system 1004 may analyze the audio data and/or corresponding text data generated, by way of example, using an ASR component, to determine that the user utterance represents an intent to control a smart device. To determine the intent associated with the user utterance, the speech-processing system 1004 may utilize a smart-home entity-recognition component 1002, which may be utilized to inform one or more intents available to the speech-processing system 1004 and/or to inform one or more values associated with the intents. For example, the user utterance of "turn off bedroom lights" may be analyzed by the speech-processing system 1004. The smart-home entity-recognition component 1002 may train or otherwise provide data to the speech-processing system 1004 indicating intents associated with operation of smart devices, such as "turn on," "turn off," "activate," "deactivate," "dim," "brighten," "lock," "unlock," etc. The smart-home entity-recognition component 1002 may additionally, or alternatively, provide data indicating identifiers and/or payloads associated with such intents, such as "light," "lights," "lock," "outlet," "switch," etc. It should be understood that while the smart-home entity-recognition component 1002 is depicted in FIG. 10 as being a component separate from the smart-home system 1006, the smart-home entity-recognition component 1002 may be a component of the smart-home system 1006.

The speech-processing system 1004 may be configured to determine that the intent corresponds to an operation configured to be performed by the smart-home system 1006, and based at least in part on such a determination, the speech-processing system 1004 may provide the intent data and/or other data associated with the request to the smart-home speechlet 907 of the smart-home system 1006. The smart-home orchestrator 1010 may be configured to receive data indicating that the smart-home speechlet 907 has been invoked to determine a directive to be performed with respect to a smart device and may query one or more other components of the smart-home system 1006 to effectuate the request. For example, the smart-home orchestrator 1010 may query the internet-of-things component 1014 to identify naming indicators associated with smart devices for a particular user account. The internet-of-things component 1014 may query data store(s) and/or the user registry 1016 and/or the user account for such naming indicators.

In other examples, such as when the smart-home speechlet 907 receives a request to discover a smart device, such as from a smart-device system, the smart-home orchestrator 1010 may query one or more components of the smart-home system 1006 to determine associations between smart device identifiers and user account identifiers as described herein. Additionally, or alternatively, as mentioned above, the smart devices may be operated based at least in part on input data received from an application residing on and/or accessible to a personal device, such as a mobile phone and/or computer. The smart-home GUI 1012 may be utilized to receive the input data and/or to display recommendations and/or requests to a user. For example, the smart-home GUI 1012 may be utilized to display a request to confirm that a selected smart device is the desired device to be acted upon.

Figure 11:
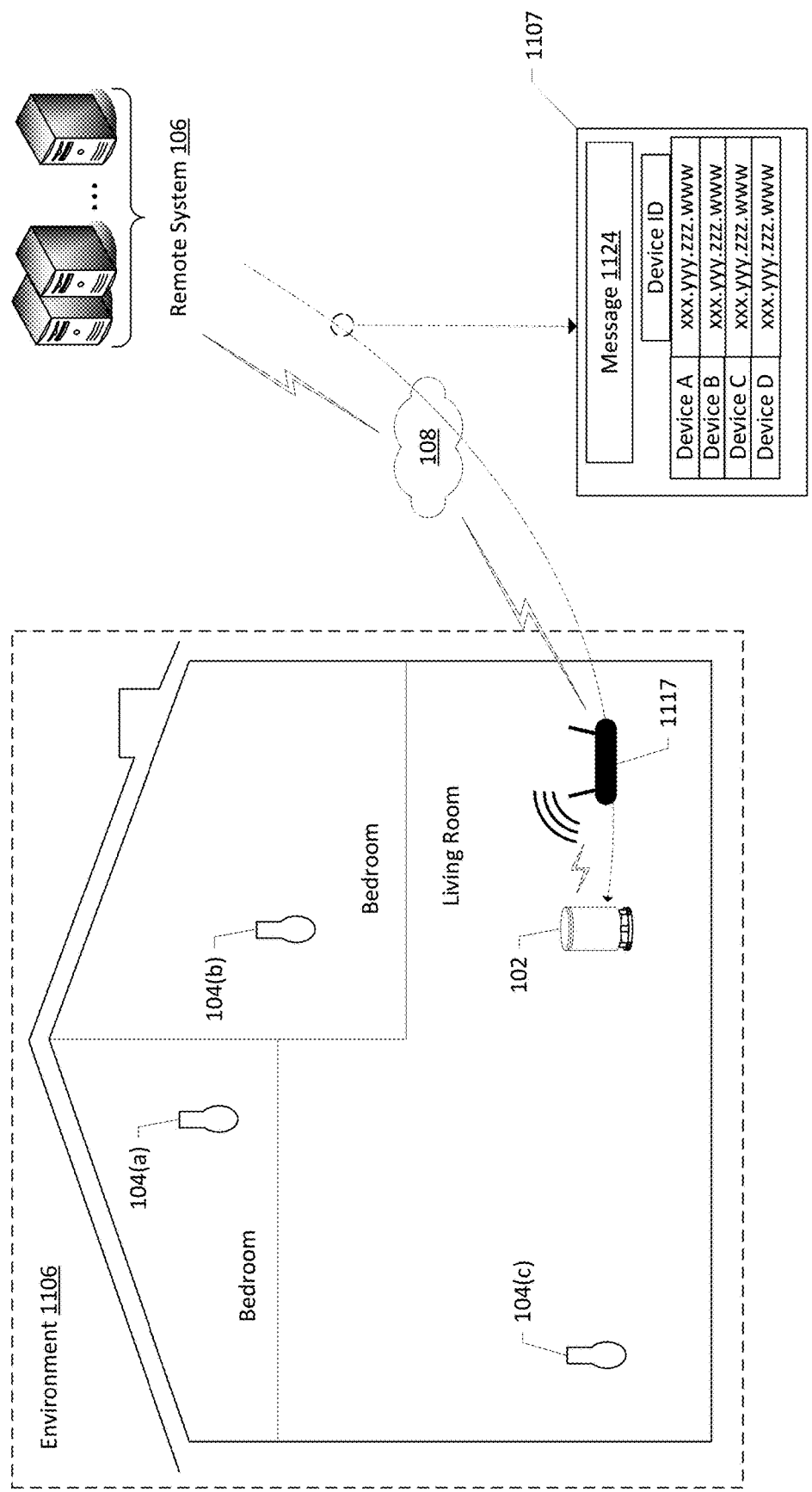
FIG. 11 illustrates a schematic diagram of an example environment for device discovery.

FIG. 11 illustrates a schematic diagram of an example environment for device discovery utilizing securely-exchanged information. FIG. 11 illustrates a discovery process that is performed when a smart device 104 is first brought online (or in response to a significant change in device-related information, described below). The discovery process shown in FIG. 11 is configured to assist in the sharing of information between devices (e.g., communication between the devices) that are registered to a user. For example, when an audio playback device 104 first boots and comes online, the device 104 can send a device identifier 1107 to a remote system 106. The device identifier can include, without limitation, an Internet Protocol (IP) address of the device 104, a media access control (MAC) address, or any other suitable device identifier identifying the device 104. Any suitable networking protocol can be utilized for transmitting information from the device 104 to the remote system 106. At least one reason for utilizing the remote system 106 for assistance in discovery of devices 104 in the environment 1106 is due to the various possible network configurations that sometimes do not allow devices 104 in the environment 1106 to "see" one another via the LAN (e.g., multiple wireless access points (WAPs) 1117 may block discovery message packets between two devices 104 in the environment 1106, discovery packets may not transcend sub-nets within the LAN, etc.).

The device identifier 1107 received by the remote system 106 can be retained in storage of the remote system 106 for use by all of the devices 104 in the environment 1106 that are registered to a user. The device identifiers 1107 maintained in the remote system's 106 storage can also be used by a client-side application executable on a user's computing device, which may provide the user with information about which devices 104 are currently online at any given point in time.

The remote system 106 can send messages (e.g., serialized notify_change( ) messages) to the devices 104 in the environment 1106, so that devices 104 can update their individual connectivity information maintained in local storage of the device 104. For example, a message 1124 received by the device 104(3) (or "device C") from the remote system 106 may include the device identifiers 1107 (e.g., the IP addresses) of the other devices in the environment 1106 so that the device 104 is made aware of the other devices and knows how to communicate with them using the device identifiers 1107 (e.g., IP addresses). In some embodiments, the remote system 106 may query devices 104 registered to a user for current device identifier 1107 information. Alternatively, the remote system 106 may access a user registry maintained in the remote system's 106 storage in association with a particular user, the user registry including the devices 104 (e.g., the devices 104 of FIG. 11) registered to a user. In this manner, the remote system 106 maintains a mapping from registered devices 104 to the user.

In response to receipt, at a device 104, of the message 1124 from the remote system 106 that includes the device identifiers 1107 of the other online devices 104 in the environment 1106, the device 104 can share additional discovery information about the device 104 with the remaining devices 104 in the environment 1106, via the LAN in the environment 1106 and/or via the remote system 106. The additional discovery information shared amongst the devices 104 in the environment 1106 may include, without limitation, a signal strength value as measured between a device 104 and a local WAP 1117 (e.g., Received Signal Strength Indication (RSSI) value), a device type, a service set identifier (SSID) of the WAP 1117, a basic SSID (BSSID) of the WAP 1117, security keys (e.g., for private transmission of data between devices 104 via the LAN in the environment 1106), and so on. Some or all of this additional discovery information can be used to select one or more master devices for time synchronization (time master) and/or audio distribution (audio distribution master) purposes. Anytime there is a significant change to the device identifier 1107 and/or the additional discovery information from the device-side, an update message can be sent to the remote system 108, and the remote system 106 may update the devices 104 in the environment 1106 (including the device 104 that initiated the change). For example, if the IP address of the device 104 changes, the device 104 can send an update message to the remote system 106. As another example, if the difference between an initial signal strength measurement (signal strength value) between the device 104 and the WAP 1117 and a subsequent signal strength measurement (signal strength value) between the device 104 and the WAP 1117 is greater than a predefined signal strength difference threshold, an update message can be sent by the device 104 to the remote system 106. This may occur when a user relocates a device 104 within the environment 1106. After discovery, devices 104 in the environment 1106 are aware of the other devices 104 in the environment 1106, and know how to contact and communicate with the other devices 104 in the environment 1106.

Figure 12:
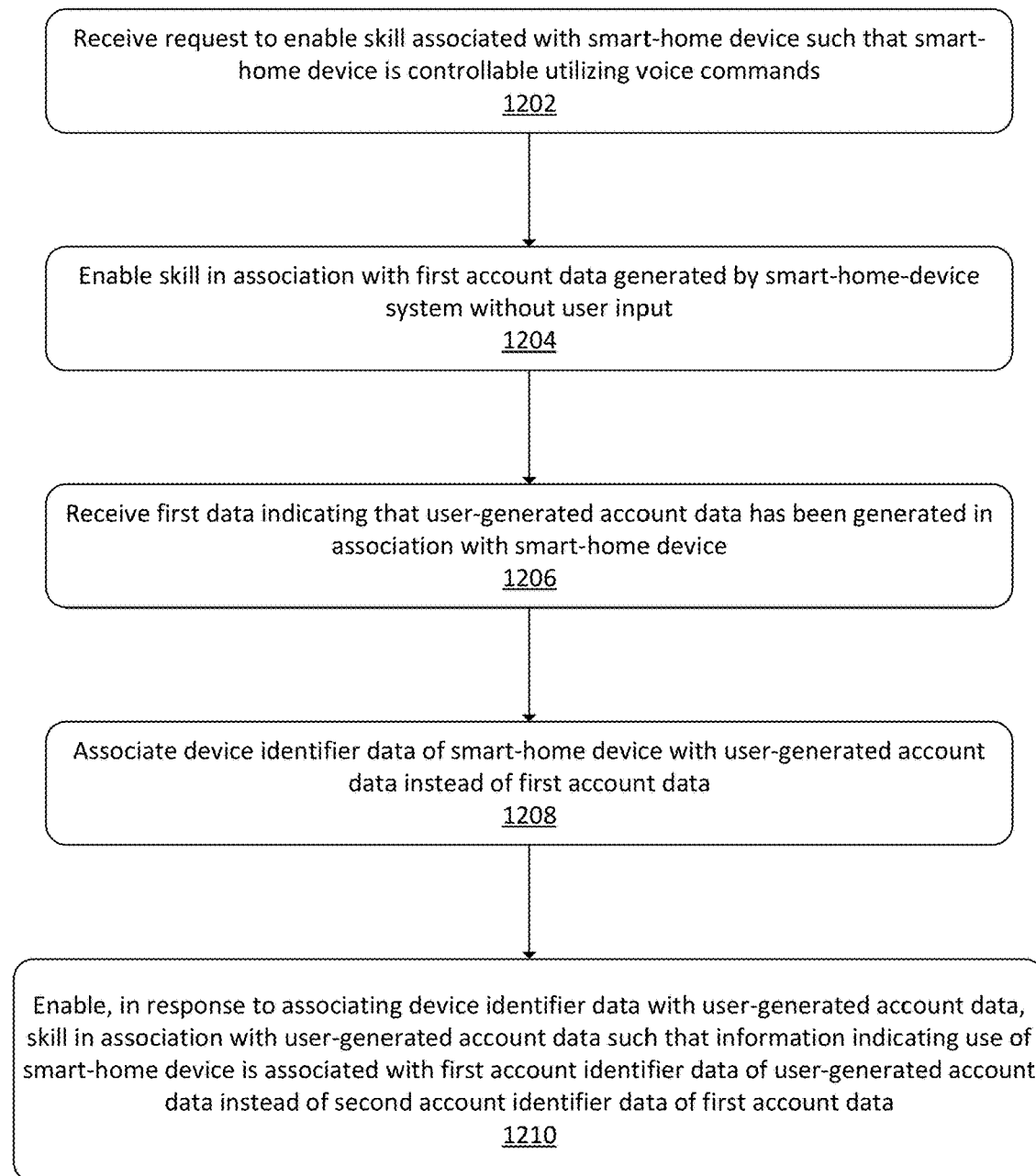
FIG. 12 illustrates a flow diagram of an example process for account merging when a user-generated account is generated following skill enablement with a smart-device system.
Figure 13:
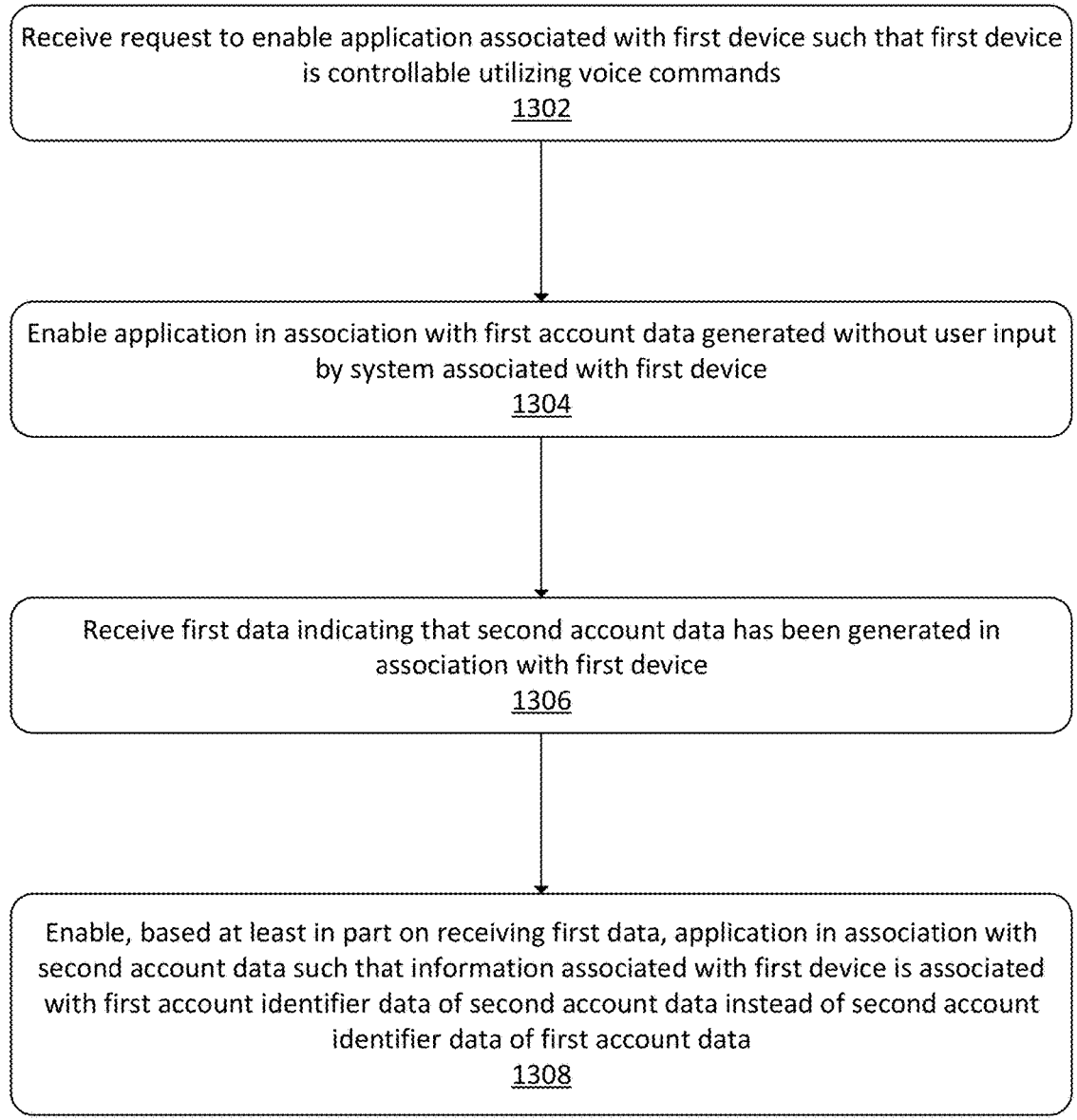
FIG. 13 illustrates a flow diagram of another example process for account merging when a user-generated account is generated following skill enablement with a smart-device system.

FIGS. 12 and 13 illustrate processes for account merging when a user-generated account is generated following skill enablement with a smart-device system. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-11, although the processes may be implemented in a wide variety of other environments, architectures and systems.

FIG. 12 illustrates a flow diagram of an example process 1200 for account merging when a user-generated account is generated following skill enablement with a smart-device system. The order in which the operations or steps are described is not intended to be construed as a limitation, and any number of the described operations may be combined in any order and/or in parallel to implement process 1200.

At block 1202, the process 1200 may include receiving a request to enable a skill associated with a smart-home device such that the smart-home device is controllable utilizing voice commands. For example, having received user identifier data from a speech-processing system, a smart-device system may generate account data to associate with the user device. This account may be described herein as a "shadow account" or "temporary account." The smart-device system may send a skill-enablement request to the speech-processing system. The skill-enablement request may include one or more authorization codes generated by an authorization-code generator, information associated with the skill at issue, the user identifier data, and/or one or more access tokens.

At block 1204, the process 1200 may include enabling the skill in association with first account data generated by a smart-home-device system without user input. For example, a provisioning component of the speech-processing system, having received the skill-enablement request from the smart-device system, may perform one or more security operations before sending a response to the skill-enablement request. For example, the provisioning component may query the user-identifier generator for an indication of whether the user identifier data provided with the skill-enablement request corresponds to user identifier data generated by the user-identifier generator in association with the skill at issue. The user-identifier generator may send a response to the provisioning component indicating that the user identifier data provided with the skill-enablement request corresponds to user identifier data generated by the user-identifier generator in association with the skill.

The provisioning component may query the account database to determine a status of account linking associated with the user identifier data. The account database may return data indicating that account data has not yet been linked to the user identifier data. The provisioning component may request skill enablement, such as by the skill-enablement component, of the speech-processing system. It should be understood that while the skill-enablement component is described as a single component, the skill-enablement component may be more than one component. The skill-enablement component may utilize the authorization codes, access tokens, user identifier, and/or skill identifier provided in the skill-enablement request to enable the skill in question. The skill-enablement component may send data to the smart-device system indicating that the skill in question has been enabled in association with the temporary account. The data may include one or more access tokens and/or authorization codes to allow for the secure exchange of information associated with use of the skill with the smart-device system. At this point, the temporary account may be linked with the skill associated with the smart-device system.

At block 1206, the process 1200 may include receiving first data indicating that user-generated account data has been generated in association with the smart-home device. For example, a user may generate an account to be utilized to operate the smart-home device. The account may be generated in association with the smart-home-device system and/or the account may be generated in association with the speech-processing system. To generate the account, the user may download or otherwise gain access to an application associated with the smart-home-device system and/or the speech-processing system and provide input, such as an account identifier, identifying information, network access information, and/or other information associated with use of smart-home devices.

At block 1208, the process 1200 may include associating device identifier data of the smart-home device with the user-generated account data instead of the first account data. For example, the device identifier data may be copied and/or transferred from the first account data to the user-generated account data.

At block 1210, the process 1200 may include enabling, in response to associating the device identifier data with the user-generated account data, the skill in association with the user-generated account data such that information indicating use of the smart-home device is associated with first account identifier data of the user-generated account data instead of second account identifier data of the first account data. For example, when the smart-home device is operated, such as via voice commands utilizing a voice-enabled device, data may be generated that represents such operations. This usage data may be associated with the user-generated account data instead of the first account data. Additionally, when a request to operate the device and/or perform an action in association with the device, the skill may be utilized to receive data and/or instructions to be utilized for operating the device. For example, the speech-processing system may receive a voice command to operate the device and may request information, via the skill, from the smart-device system to perform the operation. To enable the speech-processing system to communicate with the smart-device system for operation of the smart device, the speech-processing system may enable the skill in association with the user-generated account data instead of the first account data.

Additionally, or alternatively, the process 1200 may include storing, in a database of a speech-processing system, the first account data in association with the device identifier data. The process 1200 may also include determining, in response to receiving the first data, that the database indicates the first account data is associated with the device identifier data. The process 1200 may also include causing, in response to the database indicating the first account data is associated with the device identifier data, the device identifier data to be associated with the user-generated account data. The process 1200 may also include causing usage data indicating operation of the smart-home device to be associated with the user-generated account data instead of the first account data.

Additionally, or alternatively, the process 1200 may include in response to receiving the first data, generating a second request to associate the device identifier data from the first account data with the user-generated account data. The process 1200 may also include sending the second request to the smart-home-device system. The process 1200 may also include receiving, from the smart-home-device system, second data indicating that the device identifier data from the first account data has been associated with the user-generated account data.

Additionally, or alternatively, the process 1200 may include storing, in a database of a speech-processing system, first access credential data associated with the first account data, the first access credential data configured to be utilized by the speech-processing system to securely exchange the information associated with the first account data with the smart-home-device system. The process 1200 may also include generating, in response to enabling the skill in association with the user-generated account data, second access credential data configured to be utilized by the smart-home-device system to securely exchange information associated with the user-generated account data with the speech-processing system. The process 1200 may also include sending the second access credential data to the smart-home-device system. The process 1200 may also include receiving, from the smart-home-device system, third access credential data configured to be utilized by the speech-processing system to securely exchange the information associated with the user-generated account data.

FIG. 13 illustrates a flow diagram of an example process 1300 for account merging when a user-generated account is generated following skill enablement with a smart-device system. The order in which the operations or steps are described is not intended to be construed as a limitation, and any number of the described operations may be combined in any order and/or in parallel to implement process 1300.

At block 1302, the process 1300 may include receiving a request to enable an application associated with a first device such that the first device is controllable utilizing voice commands. For example, having received user identifier data from a speech-processing system, a smart-device system may generate account data to associate with the user device. This account may be described herein as a "shadow account" or "temporary account." The smart-device system may send a skill-enablement request to the speech-processing system. The skill-enablement request may include one or more authorization codes generated by an authorization-code generator, information associated with the skill at issue, the user identifier data, and/or one or more access tokens.

At block 1304, the process 1300 may include enabling the application in association with first account data generated without user input by a system associated with the first device. For example, a provisioning component of the speech-processing system, having received the skill-enablement request from the smart-device system, may perform one or more security operations before sending a response to the skill-enablement request. For example, the provisioning component may query the user-identifier generator for an indication of whether the user identifier data provided with the skill-enablement request corresponds to user identifier data generated by the user-identifier generator in association with the skill at issue. The user-identifier generator may send a response to the provisioning component indicating that the user identifier data provided with the skill-enablement request corresponds to user identifier data generated by the user-identifier generator in association with the skill.

The provisioning component may query the account database to determine a status of account linking associated with the user identifier data. The account database may return data indicating that account data has not yet been linked to the user identifier data. The provisioning component may request skill enablement, such as by the skill-enablement component, of the speech-processing system. It should be understood that while the skill-enablement component is described as a single component, the skill-enablement component may be more than one component. The skill-enablement component may utilize the authorization codes, access tokens, user identifier, and/or skill identifier provided in the skill-enablement request to enable the skill in question. The skill-enablement component may send data to the smart-device system indicating that the skill in question has been enabled in association with the temporary account. The data may include one or more access tokens and/or authorization codes to allow for the secure exchange of information associated with use of the skill with the smart-device system. At this point, the temporary account may be linked with the skill associated with the smart-device system.

At block 1306, the process 1300 may include receiving first data indicating that second account data has been generated in association with the first device. For example, a user may generate an account to be utilized to operate the smart-home device. The account may be generated in association with the smart-home-device system and/or the account may be generated in association with the speech-processing system. To generate the account, the user may download or otherwise gain access to an application associated with the smart-home-device system and/or the speech-processing system and provide input, such as an account identifier, identifying information, network access information, and/or other information associated with use of smart-home devices.

At block 1308, the process 1300 may include enabling, based at least in part on receiving the first data, the application in association with the second account data such that information associated with the first device is associated with first account identifier data of the second account data instead of second account identifier data of the first account data. For example, when the smart-home device is operated, such as via voice commands utilizing a voice-enabled device, data may be generated that represents such operations. This usage data may be associated with the user-generated account data instead of the first account data. Additionally, when a request to operate the device and/or perform an action in association with the device, the skill may be utilized to receive data and/or instructions to be utilized for operating the device. For example, the speech-processing system may receive a voice command to operate the device and may request information, via the skill, from the smart-device system to perform the operation. To enable the speech-processing system to communicate with the smart-device system for operation of the smart device, the speech-processing system may enable the skill in association with the user-generated account data instead of the first account data.

Additionally, or alternatively, the process 1300 may include storing, in a database of a speech-processing system, the first account data in association with device identifier data of the smart device. The process 1300 may also include determining, based at least in part on receiving the first data, that the database indicates the first account data is associated with the device identifier data. The process 1300 may also include causing, based at least in part on the database indicating the first account data is associated with the device identifier data, the device identifier data to be associated with the second account data. The process 1300 may also include causing usage data indicating operation of the smart device to be associated with the second account data instead of the first account data.

Additionally, or alternatively, the process 1300 may include based at least in part on receiving the first data, generating a second request to associate device identifier data from the first account data with the second account data. The process 1300 may also include sending the second request to the smart-device system. The process 1300 may also include receiving, from the smart-device system, second data indicating that the device identifier data from the first account data has been associated with the second account data.

Additionally, or alternatively, the process 1300 may include storing, in a database of a speech-processing system, first access credential data associated with the first account data, the first access credential data configured for the speech-processing system to securely exchange the information with the smart-home-device system. The process 1300 may also include generating, based at least in part on enabling the application in association with the second account, second access credential data for the smart-device system to securely exchange the information with the speech-processing system. The process 1300 may also include sending the second access credential data to the smart-device system. The process 1300 may also include receiving, from the smart-device system, third access credential data for the speech-processing system to securely exchange the information in association with the second account data.

Additionally, or alternatively, the process 1300 may include determining, based at least in part on receiving the first data, that device identifier data of the smart device is associated with a status indicating that device identifier has yet to be associated with user-generated account data. In these examples, enabling the application in association with the second account may be based at least in part on the status.

Additionally, or alternatively, the process 1300 may include storing, in association with the first account data, second data indicating usage history of the smart device via the voice commands. The process 1300 may also include causing, based at least in part on enabling the application in association with the second account data, the second data to be associated with the second account.

Additionally, or alternatively, the process 1300 may include storing, in association with the second account data, second data indicating a user-defined operation preference for smart devices. The process 1300 may also include associating the user-defined operation preference with the smart device based at least in part on enabling the application in association with the second account data.

Additionally, or alternatively, the process 1300 may include receiving second data indicating that a second smart device has initiated communication with the smart-device system. The process 1300 may also include determining that the second smart device is associated with the second account data. The process 1300 may also include enabling the application for use in association with the second smart device based at least in part on the second smart device being associated with the second account data.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A method, comprising:
   creating a first account, in response to a request from a first device, without user input by a system associated with the first device;
   adding permission to utilize a first application to enable control of the first device by voice commands to first application permissions for the first account;
   receiving first data indicating that a second account has been generated in association with the first device; and
   merging the first application permissions of the first account with second application permissions of the second account in response to receiving the first data.

2. The method of claim 1, further comprising:
   storing, in a database of the system, first account data associated with the first account;
   determining, based at least in part on receiving the first data, that the database indicates the first account data is associated with a device identifier of the first device;

causing, based at least in part on the database indicating the first account data is associated with the device identifier, the device identifier to be associated with the second account.

3. The method of claim 1, further comprising, causing, based at least in part on the merging, second data indicating operation of the first device to be associated with the second account.

4. The method of claim 1, wherein the request comprises a first request, and the method further comprises:
based at least in part on receiving the first data, generating a second request to associate device identifier data from the first account with the second account;
sending the second request to the system; and
receiving, from the system, second data indicating that the device identifier data from the first account has been associated with the second account.

5. The method of claim 1, further comprising:
storing, in a database of the system, first access credential data associated with the first account;
generating, based at least in part on the merging, second access credential data for the system associated with the first device to securely exchange information with the system;
sending the second access credential data to the system; and
receiving, from the system, third access credential data for the system to securely exchange the information in association with the second account.

6. The method of claim 1, further comprising:
determining, based at least in part on receiving the first data, that device identifier data of the first device is associated with a status indicating that a device identifier has yet to be associated with user-generated account data, wherein the merging comprises associating the device identifier with the user-generated account data.

7. The method of claim 1, further comprising:
storing, in association with the first account, second data indicating usage history of the first device via the voice commands; and
causing, based at least in part on the merging, the second data to be associated with the second account.

8. The method of claim 1, further comprising:
storing, in association with the second account, second data indicating a user-defined operation preference for devices; and
associating the user-defined operation preference with the first device based at least in part on the merging.

9. The method of claim 1, further comprising:
receiving second data indicating that a second device has initiated communication with the system;
determining that the second device is associated with the second account; and
associating the second device with the first device based at least in part on the merging.

10. The method of claim 1, further comprising:
determining that a device has been queried to display an indication of application permissions associated with the device;
determining that the device is authorized in association with the first account or the second account; and
causing display of the indication of the first application permissions and the second application permissions on the device based at least in part on the device being authorized in association with the first account or the second account.

11. A system, comprising:
one or more processors; and
non-transitory computer-readable media storing instructions that, when executed by the one or more processors, cause the one or more processors to perform operations comprising:
creating a first account, in response to a request from a first device, without user input by the system associated with the first device;
adding permission to utilize a first application to enable control of the first device by voice commands to first application permissions for the first account;
receiving first data indicating that a second account has been generated in association with the first device; and
merging the first application permissions of the first account with second application permissions of the second account in response to receiving the first data.

12. The system of claim 11, the operations further comprising:
storing, in a database, first account data associated with the first account;
determining, based at least in part on receiving the first data, that the database indicates the first account data is associated with a device identifier of the first device;
causing, based at least in part on the database indicating the first account data is associated with the device identifier, the device identifier to be associated with the second account.

13. The system of claim 11, the operations further comprising, causing, based at least in part on the merging, second data indicating operation of the first device to be associated with the second account.

14. The system of claim 11, wherein the request comprises a first request, and the operations further comprise:
receiving a second request to associate device identifier data from the first account with the second account; and
generating, in response to the second request, second data indicating that the device identifier data from the first account has been associated with the second account.

15. The system of claim 11, the operations further comprising:
storing, in a database, first access credential data associated with the first account;
receiving, based at least in part on the merging, second access credential data for the system to securely exchange information with the first device; and
generating third access credential data for the system to securely exchange the information in association with the second account.

16. The system of claim 11, the operations further comprising:
determining, based at least in part on receiving the first data, that device identifier data of the first device is associated with a status indicating that a device identifier has yet to be associated with user-generated account data, wherein the merging comprises associating the device identifier with the user-generated account data.

17. The system of claim 11, the operations further comprising:
storing, in association with the first account, second data indicating usage history of the first device via the voice commands; and
causing, based at least in part on the merging, the second data to be associated with the second account.

18. The system of claim 11, the operations further comprising:
- storing, in association with the second account, second data indicating a user-defined operation preference for devices; and
- associating the user-defined operation preference with the first device based at least in part on the merging.

19. The system of claim 11, the operations further comprising:
- receiving second data indicating that a second device has initiated communication with the system;
- determining that the second device is associated with the second account; and
- associating the second device with the first device based at least in part on the merging.

20. The system of claim 11, the operations further comprising:
- determining that a device has been queried to display an indication of application permissions associated with the device;
- determining that the device is authorized in association with the first account or the second account; and
- sending a command to display the indication of the first application permissions and the second application permissions on the device based at least in part on the device being authorized in association with the first account or the second account.

* * * * *